United States Patent
Kabir et al.

(10) Patent No.: US 11,506,642 B1
(45) Date of Patent: Nov. 22, 2022

(54) MATERIALS AND METHODS FOR EXTRACTING METALS

(71) Applicants: Abuzar Kabir, Miami, FL (US); Kenneth G. Furton, Homestead, FL (US)

(72) Inventors: Abuzar Kabir, Miami, FL (US); Kenneth G. Furton, Homestead, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 17/483,961

(22) Filed: Sep. 24, 2021

(51) Int. Cl.
*B01J 20/26* (2006.01)
*B01J 20/282* (2006.01)
*B01J 20/291* (2006.01)
*B01J 20/281* (2006.01)
*G01N 1/40* (2006.01)

(52) U.S. Cl.
CPC ............ *G01N 30/48* (2013.01); *B01J 20/262* (2013.01); *B01J 20/282* (2013.01); *B01J 20/291* (2013.01); *G01N 1/405* (2013.01); *B01J 2220/54* (2013.01); *B01J 2220/58* (2013.01); *B01J 2220/86* (2013.01)

(58) Field of Classification Search
CPC .. G01N 30/48; G01N 1/405; G01N 2030/486; B01J 20/262; B01J 20/291; B01J 2220/54; B01J 2220/58; B01J 2220/86; B01J 20/282
See application file for complete search history.

(56) References Cited

U.S. PATENT DOCUMENTS

2017/0108520 A1* 4/2017 Kabir .................. G01N 33/9446
2020/0230571 A1* 7/2020 Kabir .................. B01J 20/28076

OTHER PUBLICATIONS

Das, D., et al., "Recent advances in on-line solid-phase pre-concentration for inductively-coupled plasma techniques for determination of mineral elements", Trends in Analytical Chemistry, 33, pp. 35-45. (Year: 2012).*
Fan, H., et al., "Selective Removal of Iron from Aqueous Solution Using Ion Imprinted Thiocyanato-Functionalized Silica Gel Sorbents." Korean J. Chem. Eng., 2012, 29(6): 798-803.
Manousi, N., et al., "Automated Solid Phase Extraction of Cd(II), Co(II), Cu(II) and Pb(II) Coupled with Flame Atomic Absorption Spectrometry Utilizing a New Sol-Gel Functionalized Silica Sorbent." Separations, 2021, 8(100): 1-13.
Manousi, N., et al., "Multi-Element Analysis Based on an Automated On-Line Microcolumn Separation/Preconcentration System Using a Novel Sol-Gel Thiocyanatopropyl-Functionalized Silica Sorbent Prior to ICP-AES for Environmental Water Samples." Molecules, 2021, 26(4461): 1-13.

(Continued)

*Primary Examiner* — Benjamin L Lebron
(74) *Attorney, Agent, or Firm* — Saliwanchik, Lloyd & Eisenschenk

(57) ABSTRACT

The subject invention provides materials, devices and methods for detecting, determining, monitoring and/or extracting trace metals such as cadmium, lead, copper, chromium, cobalt, nickel, zinc, manganese, mercury, and vanadium in the environmental, biological, pharmaceutical, and potable water samples. The subject invention also provides formulations and method for synthesizing the trace metal-extracting materials.

19 Claims, 8 Drawing Sheets

3-Thiocyanatopropyl/3-aminopropyl functionalized sol-gel silica sorbent

(56) References Cited

OTHER PUBLICATIONS

Sui, D., et al., "Sol-gel-derived Thiocyanato-Functionalized Silica Gel Sorbents for Adsorption of Fe(III) Ions from Aqueous Solution: Kinetics, Isotherms and Thermodynamics." J Sol-Gel Sci Technol., 2016, 80: 504-513.

Wu, J., et al., "Sol-Gel Derived Ion Imprinted Thiocyanato-Functionalized Silica Gel as Selective Adsorbent of Cadmium(II)." J Sol-Gel Sci Technol, 2013, 66:434-442.

* cited by examiner

MATERIALS AND METHODS FOR EXTRACTING METALS

BACKGROUND OF THE INVENTION

Trace metals are continuously released in the environment through natural and anthropogenic processes. Some elements or elemental species (e.g., lead, cadmium, mercury etc.) exhibit toxicity even at low concentration levels. Other metals, such as copper and zinc are essential micronutrients, and they are required for the biological processes of living organisms. As a result, the monitoring of toxic and nutrient elements in environmental samples has aroused considerable concern.

Currently, a wide variety of spectroscopic techniques including flame atomic absorption spectroscopy (FAAS), electrothermal atomic absorption spectroscopy (ETAAS), inductively couple plasma atomic emission spectroscopy (ICP-AES) and inductively couple plasma mass spectrometry (ICP-MS) are available for the determination of nutrient and toxic elements. Among the different available spectroscopic techniques, ICP-AES ones are widely employed in trace and ultra-trace analysis, due to their plethora of benefits, including high sensitivity, extended linear working ranges for the target analytes, as well as the ability of rapid multi-element determinations. However, the direct determination of elements is a challenging endeavor due to their very low concentration levels, as well as the matrix effects. Therefore, a sample separation/preconcentration step is typically required to improve the sensitivity of common atomic spectroscopic techniques.

Flow injection (FI) and related techniques have been proved to be appropriate for on-line fluidic manipulation and for automated sample processing. On-line automated systems are highly attractive sample preparation platforms due to the minimization of reagents consumption, the reduced laboratory time and operation cost, in combination with the achievement of high extraction efficiency and enhancement factors.

Solid-phase extraction (SPE) is by far the most attractive approach for sample preparation and preconcentration, since it offers a plethora of benefits including superior performance in terms of straightforward operation, versatility, reliability and high separation and enrichment capability of the target analytes. Typically, SPE utilizes packed or disk phase microcolumns, filled with the desired sorbent and placed within the flow network prior to the detection system. As a result, the sorptive phase is considered as an integral component of the flow system and it is repeatedly used for the loading and the elution of the sample solution. However, the application of on-line automated systems for multi-element separation/preconcentration as a front-end to ICP-AES systems reported in the literature, are limited.

Chen et al. (2010) evaluated the utilization of thiacalix [4]arene tetracarboxylate derivative modified mesoporous $TiO_2$ for the extraction of vanadium, copper, lead and chromium. Peng et al. (2016) synthesized a multi-wall carbon nanotubes chemically modified silica adsorbent for the on-line SPE of Zn(II), Cu(II), Cd(II), Cr(III), V(V) and As(V) from environmental water samples. Alumina hollow fibers have been evaluated for the on-line membrane solid phase microextraction of copper, manganese and nickel from environmental water samples. Chitosan-based materials can be used for the development of on-line platforms for multi-element determination.

Unequivocally, over the past few years attention has been directed towards the development and evaluation of novel sorptive phases for on-line systems aiming to develop automated methods characterized by high accuracy and sensitivity. In this frame, a variety of sorbents have arisen including carbon nanotubes, magnetic nanoparticles, metal oxides, 3D printed materials and functionalized silicas. Among them, silica-based materials appear to be an excellent choice of support to develop sorptive phases for the extraction of metal ions. Due to their high surface area in combination with the presence of highly reactive silanol groups in its structure, the surface of silicas enables the chemical modification through immobilization of O-, N-, and S-containing organic functional groups.

Sol-gel technology has been proved to be a significant tool for the preparation of advanced hybrid inorganic-organic polymer coatings. This technology enables the chemical integration of the sol-gel sorbent to the substrate in a wide variety of forms (e.g., as particles, fiber, fabric etc). Sol-gel materials exhibit various advantages, such as tunable porosity, selectivity, as well as good chemical and thermal stability and thus they offer an excellent choice for fabricating automated on-line renewable micro-column preconcentration platforms for multi-element analysis. Although sol-gel materials have been proved to be powerful sorbents for the microextraction of organic compounds, the applications of sol-gel materials for the development of multi-element analytical techniques are limited and they are typically applied as in-tube or capillary surface coatings.

Towards the exploration of sol-gel sorbents for the extraction and preconcentration of metals, Castro et al. (2008) prepared a column packed with silica obtained by sol-gel method and functionalized with 2-aminothiazole. The proposed sorbent was employed for the preconcentration of cadmium, copper and nickel from water samples offering fast kinetics and high adsorption capacity. In 2016, Anthemidis et al. evaluated four different sol-gel sorbents (i.e., sol-gel polytetrahydrofuran, sol-gel polydimethyldiphenylsiloxane, sol-gel triblock copolymers of poly(ethylene oxide) and poly(propylene oxide) and sol-gel graphene) for the flow injection-fabric disk sorptive (FI-FDSE) extraction of lead and cadmium from environmental samples. This approach was an automated alternative to conventional fabric phase extraction (FPSE). However, the exploration of sol-gel materials in multi-element analytical techniques for the simultaneous determination of toxic and nutrient elements is a research field that has yet to be explored.

Thus, there is a need for developing materials, devices and methods for determining, monitoring and extracting trace metals such as cadmium, lead, copper, chromium, cobalt, nickel, zinc, manganese, mercury, and vanadium in environmental and drinking water samples.

BRIEF SUMMARY OF THE INVENTION

The subject invention provides materials, devices and methods for detecting, determining, monitoring and/or extracting target analytes such as trace metals, e.g., cadmium, lead, copper, chromium, cobalt, nickel, zinc, manganese, mercury, and vanadium, in environmental, biological, pharmaceutical, and potable water samples.

In one embodiment, the subject invention provides a thiocyanatopropyl functionalized sol-gel silica sorbent comprising a polymeric network of an acid hydrolyzed, base condensed thiocyanatopropyl functionalized sol-gel precursor, and optionally, a network precursor, wherein the thiocyanatopropyl functionalized sol-gel precursor is a sol-gel silica precursor comprising a thiocyanatopropyl group.

In a specific embodiment, the thiocyanatopropyl functionalized sol-gel precursor is 3-thiocayanatopropyl triethoxysilane. The network precursor is tetramethyl orthosilicate (TMOS), tetraethyl orthosilicate (TEOS) or tetrapropyl orthosilicate (TPOS).

In one embodiment, the subject invention targets the sustained need for a robust metal extraction sorbent. As a downstream platform for sample preparation, the new sorbent can be used to prepare samples for ICP-MS, ICP-OES, Graphite Furnace Atomic Absorption Spectroscopy and other metal detection and monitoring platforms. The new sorbent can be used in water filtration units—household, industrial and laboratory settings. The sorbent can also be used for heavy metal mitigation in wastewater treatment plants. Due to its ability to regenerate, the sorbent can be used in hundreds of operational cycles, which can reduce treatment costs. Advantageously, the technology is green and inexpensive.

In one embodiment, the subject invention provides a method for synthesizing the thiocyanatopropyl functionalized sol-gel silica sorbent, the method comprising mixing a functional sol-gel precursor with a solvent and, optionally, a network precursor, to form a sol solution, wherein the functional sol-gel precursor comprises a thiocyanatopropyl group; adding a reaction catalyst; and adding a basic catalyst.

In a specific embodiment, the functional sol-gel precursor is 3-thiocayanatopropyl triethoxysilane. In a preferred embodiment, the network precursor is tetramethyl orthosilicate (TMOS), tetraethyl orthosilicate (TEOS) or tetrapropyl orthosilicate (TPOS). In another preferred embodiment, the reaction catalyst is an acid selected from HCl, trifluoroacetic acid (TFA) and HF. In specific embodiments, the basic catalyst is $NH_4OH$, NH4F, 3-aminopropyl trimethoxysilane (3-APTMS) and/or 3-aminopropyl triethoxysilane (3-APTES).

In one embodiment, the subject invention provides an automated on-line sample separation and/or preconcentration platform based on sol-gel technology as a front-end to inductively coupled plasma atomic emission spectroscopy (ICP-AES). The platform is fabricated by packing the sol-gel thiocyanatopropyl functionalized silica sorbent of the subject invention in an easy repacking microcolumn and it is coupled with ICP-AES for multi-element analysis. The novel platform is highly sensitive and accurate. The platform of the subject invention can be employed for the determination of cadmium, lead, copper, chromium, cobalt, nickel, zinc, manganese, mercury, and/or vanadium in, for example, environmental and drinking water samples.

In one embodiment, the subject invention also provides a flow injection system for preconcentration and/or extraction of a target analyte from a sample, which comprises a microcolumn comprising the thiocyanatopropyl functionalized sol-gel silica sorbent of the subject invention, wherein the microcolumn is in fluid communication with first and second 6-port 2 position injection valves and a detector.

In a specific embodiment, the detector is ICP-AES or part of ICP-AES, such as the neutralizer of ICP-AES.

In one embodiment, the subject invention further provides a method for detecting, determining, monitoring and/or extracting one or more trace metals from a sample, e.g., fluid sample, the method comprising passing the sample through the flow injection system of the subject invention; passing an eluent solution through the flow injection system to obtain an eluent; and detecting one or more trace metals in the eluent. In one embodiment, the method further comprises quantifying the concentration of the one or more trace metals in the eluent.

In specific embodiments, the one or more trace metals are selected from Cd(II), Pb(II), Cu(II), Cr(III), Co(II), Ni(II), Zn(II), Mn(II), Hg(II), and V(II).

In certain embodiments, the fluid sample is selected from physiological fluids, forensic specimens, environmental pollutants, food samples, beverage samples, pharmaceutical samples, chemical samples, drug residues and metabolites thereof, and poison residues and metabolites thereof.

DETAILED DESCRIPTION OF THE INVENTION

Figure 1:
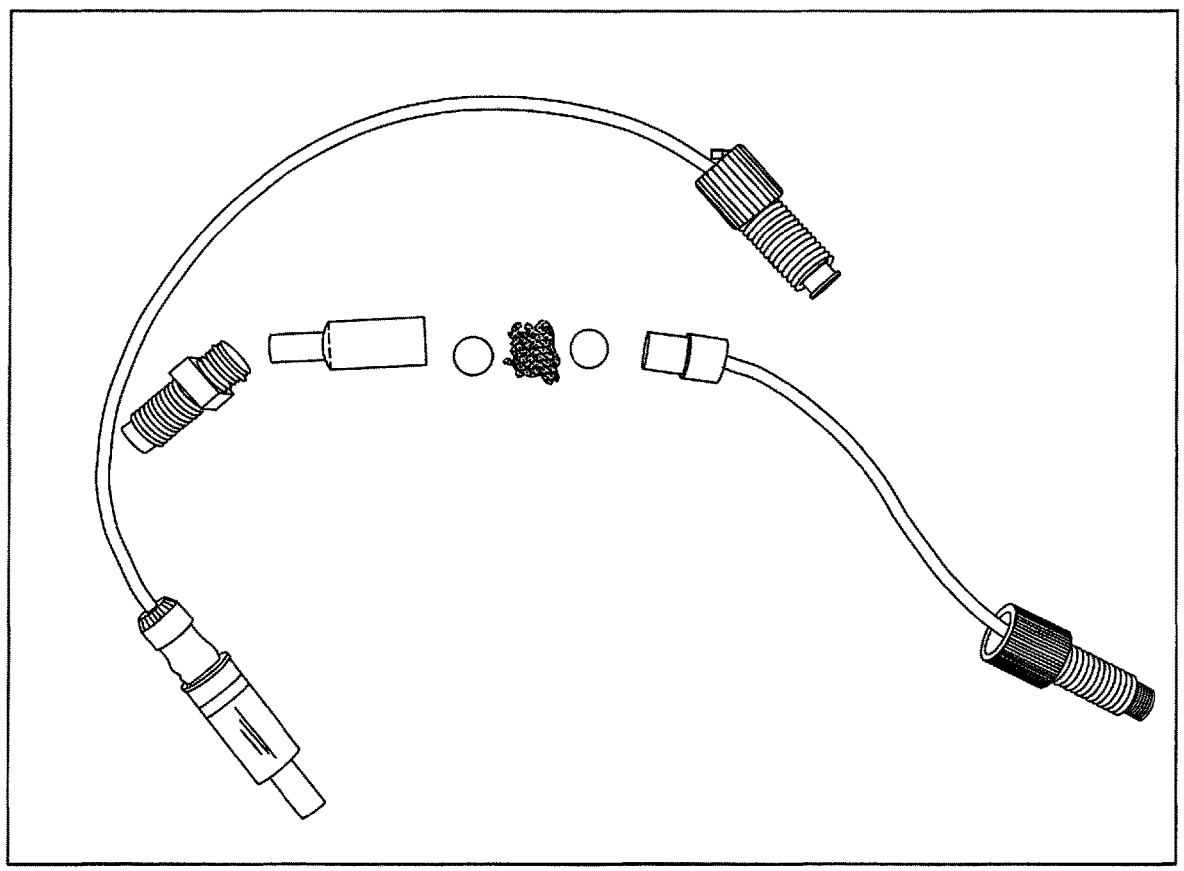
FIG. 1 shows the construction and the main components of the metal extraction microcolumn.

The subject invention provides materials, devices and methods for detecting, determining, monitoring and/or extracting trace metals such as cadmium, lead, copper, chromium, cobalt, nickel, zinc, manganese, mercury, and vanadium in environmental, biological, pharmaceutical, and/or potable water samples.

In one embodiment, the subject invention provides robust metal extraction sorbents to extract and pre-concentrate d-block elements together to assess their presence, bioaccumulation and fate in the environment as well as in the body of a subject. As a downstream platform for sample preparation, the sorbent of the subject invention can be used to prepare samples for ICP-MS, ICP-OES, Graphite Furnace Atomic Absorption Spectroscopy and other metal detection and monitoring platforms. The sorbent can be used in water filtration units, including household, industrial and laboratory settings. The sorbent can also be used for heavy metal mitigation in wastewater treatment plants.

Advantageously, the sorbent of the subject invention has the ability to regenerate. Thus, the sorbent can be used in hundreds of operational cycles, thereby substantially reducing treatment costs. Advantageously, the technology is green and inexpensive. The technology has a broad range of applications including water filtration systems including household, laboratory and industrial settings, wastewater treatment plants, and environmental laboratories.

In one embodiment, the subject invention provides a sol-gel silica sorbent comprising a polymeric network of an acid hydrolyzed, base condensed thiocyanatopropyl functionalized sol-gel precursor, and optionally, a network precursor, wherein the thiocyanatopropyl functionalized sol-gel precursor is a sol-gel silica precursor comprising a thiocyanatopropyl group.

In one embodiment, the sol-gel silica sorbent can be synthesized through a sol-gel reaction using an acidic catalyst, such as, HCl, trifluoroacetic acid (TFA) and HF, for hydrolysis and subsequent polycondensation using a basic catalyst, for example, but not limited to, $NH_4OH$ and/or $NH_4F$, resulting in a polymeric network.

The subject invention provides the first successful synthesis of thiocyanatopropyl functionalized sol-gel silica sorbents that are capable of extracting a broad range of metal species from aqueous solution.

In a specific embodiment, the sol-gel silica sorbent is synthesized via a sol-gel reaction by employing a 3-thiocyanatopropyl functionalized sol-gel precursor, a networking precursor, such as tetraethyl orthosilicate (TEOS) or tetramethyl orthosilicate (TMOS), and a solvent, such as isopropanol, and an acidic catalyst for hydrolysis, followed by polycondensation using a basic catalyst, for example, $NH_4OH$.

In one embodiment, the subject invention provides a method of synthesizing a thiocyanatopropyl functionalized sol-gel silica sorbent, the method comprising:

1) mixing a functional sol-gel precursor with a network precursor in the presence of a solvent to form a sol solution, wherein the functional sol-gel precursor comprises a thiocyanatopropyl group;

2) hydrolyzing the product of step 1) in the presence of a reaction catalyst; and 3) adding a basic solution to the product of step 2) for polycondensation.

In one embodiment, the method for synthesizing a thiocyanatopropyl functionalized sol-gel silica sorbent further comprises incubating the mixture to form a polymer network and allowing the network to age. The method can also comprise an incubating step between each of the other steps.

In one embodiment, the functional sol-gel precursor and the network precursor in the sol solution have a molar ratio of at least, for example, 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, 1:10 or any ratio therebetween. The functional sol-gel precursor and the solvent in the sol solution have a molar ratio, for example, from 1:1 to 1:100, from 1:1 to 1:90, from 1:1 to 1:80, from 1:1 to 1:70, from 1:1 to 1:60, from 1:1 to 1:50, from 1:1 to 1:40, from 1:1 to 1:30, from 1:1 to 1:20, from 1:1 to 1:10, from 1:5 to 1:50, from 1:10 to 1:50, from 1:15 to 1:50, from 1:20 to 1:50, or from 1:25 to 1:50.

In one embodiment, the reaction catalyst may be added in the mixture at a molar ratio, between the network precursor and the reaction catalyst, of at least 1:1, 1:2, 1:3, 1:4, 1:5, 1:6, 1:7, 1:8, 1:9, 1:10 or any ratio therebetween. In one embodiment, the basic solution may be added in the mixture at a molar ratio, between the network precursor and the reaction catalyst, of at least 1:1, 1:2, 1:3, 1:4, 1:5, 1:6, 1:7, 1:8, 1:9, 1:10 or any ratio therebetween.

In one embodiment, the hydrolysis and/or polycondensation steps may be performed at an elevated temperature, for example, >40° C., >50° C., >60° C., >70° C. or >80° C.

In one embodiment, the functional sol-gel precursor is a hydrolysable alkoxysilane sol-gel precursor comprising one or more alkoxyl groups or one or more alkyl groups, wherein one of the alkoxyl and alkyl groups is substituted by a thiocyanatopropyl group. In a specific embodiment, the hydrolysable alkoxysilane sol-gel precursor is selected from, for example, tetraalkyl orthosilicates, such as tetramethyl orthosilicate (TMOS), tetraethyl orthosilicate (TEOS) and tetrapropyl orthosilicate (TPOS), alkyl trialkoxysilanes, such as methyltrimethoxysilane (MTMS) and methyltriethoxysilane, and aryl trialkoxysilanes. In a specific embodiment, the functional sol-gel precursor is 3-Thiocayanatopropyl triethoxysilane.

In some embodiments, the alkoxy group can be methoxy, ethoxy, or higher alkoxy groups, such as, but not limited to, n-propoxy, iso-propoxy, n-butoxy, or sec-butoxy groups.

In one embodiment, the network precursor is selected from tetraalkyl orthosilicates such as tetramethyl orthosilicate (TMOS), tetraethyl orthosilicate (TEOS) and tetrapropyl orthosilicate (TPOS).

In certain embodiments, the solvent is selected from methanol, ethanol, isopropanol, formic acid, acetonitrile, acetone, and mixtures thereof.

In certain embodiments, the reaction catalyst is an acid selected from, for example, HCl, $H_2SO_4$, $HNO_3$ trifluoroacetic acid (TFA), acetic acid and HF. In specific embodiments, the acid has a concentration from about 0.01 to about 1M, from about 0.05 to about 1M, from about 0.1M to about 1M, from about 0.1 to about 0.5 M, or from about 0.1 to 0.2M.

In one embodiment, the basic solution is $NH_4OH$ and/or $NH_4F$.

In a specific embodiment, the sol-gel silica sorbent can also be synthesized via a sol-gel reaction by employing a 3-Thiocyanatopropyl functionalized sol-gel precursor, and a solvent such as isopropanol, and an acidic catalyst for hydrolysis, followed by polycondensation using 3-aminopropyl trimethoxysilane (3-APTMS) or 3-aminopropyl triethoxysilane (3-APTES) as a basic catalyst. The loading of 3-thiocyanopropyl functional group can be maximized by hydrolyzing and subsequent polycondensation of a single precursor without involving any networking precursor such as tetraethyl orthosilicate (TEOS) or tetramethyl orthosilicate (TMOS). The presence of aminopropyl functionality in the composite sorbent may synergistically improve the metal extraction capacity of the resulting sorbent.

In one embodiment, the subject invention provides a method of synthesizing a thiocyanatopropyl and aminopropyl functionalized sol-gel silica sorbent in the absence of a network precursor, the method comprising:

1) mixing a functional sol-gel precursor with a solvent, wherein the functional sol-gel precursor comprises a thiocyanatopropyl group;

2) hydrolyzing the product of step 1) in the presence of a reaction catalyst; and 3) adding a basic catalyst to the product of step 2) for polycondensation, wherein the basic catalyst comprises an aminopropyl group.

In one embodiment, the subject invention provides a method of synthesizing a thiocyanatopropyl functionalized sol-gel silica sorbent in the absence of a network precursor, the method comprising: hydrolyzing a functional sol-gel precursor in the presence of a solvent and a reaction catalyst, wherein the functional sol-gel precursor comprises a thiocyanatopropyl group; and adding a basic catalyst for polycondensation.

In one embodiment, the method for synthesizing a thiocyanatopropyl functionalized sol-gel silica sorbent further comprises incubating the mixture to form a polymer network and allowing the network to age. The method can also comprise an incubating step between each of the other steps.

In a specific embodiment, the functional sol-gel precursor is 3-thiocayanatopropyl triethoxysilane. In a specific embodiment, the solvent is isopropanol. In a specific embodiment, the reaction catalyst is HCl.

In one embodiment, the basic catalyst is 3-aminopropyl trimethoxysilane (3-APTMS) or 3-aminopropyl triethoxysilane (3-APTES).

In one embodiment, the method further comprises:
drying the synthesized sol-gel sorbent gel;
crushing and pulverizing the dried sol-gel sorbent into fine particles;
cleaning the crushed sol-gel sorbent, wherein the cleaning comprises mixing the crushed sol-gel sorbent with a cleaning solution and wherein the cleaning solution comprises a mixture of methanol and methylene chloride; and
drying the crushed sol-gel sorbent.

In an exemplary embodiment, the sol-gel silica sorbents of the subject invention facilitate good extraction and preconcentration performance for trace metals and can be used at least, for example, 2, 3, 4, 5, 6, 7, 8, 9 or 10 times without significantly losing their extraction capacity.

In one embodiment, the subject invention provides a novel on-line automated sample preconcentration and separation platform utilizing an easy repacking micro-column. The sorbent is based on sol-gel technology and the developed manifold can be employed for multi-element analysis through coupling with ICP-AES. The microcolumns packed with sol-gel functionalized sol-gel thiocyanatopropyl silica, offer limited flow resistance, excellent packing reproducibility, good preconcentration efficiency, as well as sensitivity. The novel microcolumns are reusable for, for example, 700 loading/elution cycles. The sol-gel chemistry is an alternative for the development of metal adsorbents without requiring the addition of chelating agents for complex formation.

In one embodiment, the subject invention provides a method for detecting, determining, monitoring and/or extracting one or more trace metals from a sample, the method comprising:
providing a thiocyanatopropyl functionalized sol-gel silica sorbent dried and packaged in an apparatus capable of performing trace metal extraction, wherein the apparatus comprises, for example, a column, a syringe, a pouch, or a packet;
passing the sample through the thiocyanatopropyl functionalized sol-gel silica sorbent;
passing an eluent solution through the thiocyanatopropyl functionalized sol-gel silica sorbent to obtain an eluent;
detecting one or more trace metals in the eluent; and
optionally, quantifying the concentration of the one or more trace metals in the eluent of the thiocyanatopropyl functionalized sol-gel silica sorbent.

In some embodiments, the detection and/or quantification can be performed by flame atomic absorption spectroscopy (FAAS), electrothermal atomic absorption spectroscopy (ETAAS), ICP-AES, ICP-MS, ICP-OES, Graphite Furnace Atomic Absorption Spectroscopy or other metal detection and monitoring platform.

In one embodiment, the one or more trace metals are selected from Cd, Co, Ni, Pb, Zn, Hg, Cu, Cr, Mn and V.

In specific embodiments, the sample is a fluid sample selected from, for example, physiological fluids, forensic specimens, environmental pollutants, food samples, beverage samples, pharmaceutical samples, chemical samples, drug residues and metabolites thereof, and poison residues and metabolites thereof.

In one embodiment, the sample has a pH value in the range, for example, from about 2.0 to about 8.0, from about 2.0 to about 7.5, from about 2.0 to about 7.0, from about 2.5 to about 7.0, from about 2.5 to about 6.5, from about 3.0 to about 6.5, from about 3.5 to about 6.5, from about 4.0 to about 7.0, from about 4.0 to about 6.5, from about 4.0 to about 6.0, from about 4.5 to about 6.0, from about 4.0 to about 5.5, from about 4.5 to about 5.5, from about 4.0 to about 5.0, or from about 4.5 to about 5.0.

Figure 2:
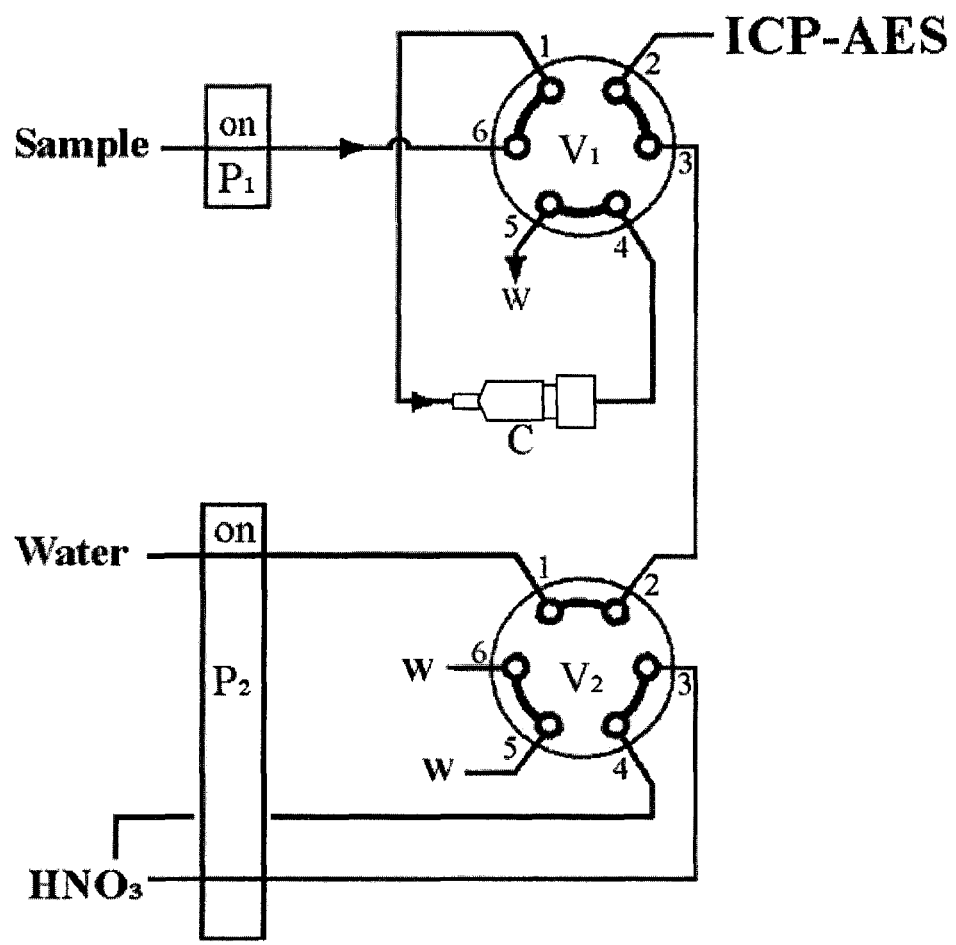
FIG. 2 shows the schematic diagram of the on-line column preconcentration manifold for multielement analysis by ICP-AES. $P_1$, $P_2$ peristaltic pumps; $V_1$, $V_2$ injection valves, $V_1$ in "load" position; $V_2$ in "A" position; W, waste; C, microcolumn packed with sol-gel thiocyanatopropyl silica sorbent.

In a specific embodiment, the subject invention provides a flow injection system for on-line column preconcentration of the target analyte(s) coupled with the ICP-AES, as shown schematically in FIG. 2. The system comprises two peristatic pumps P1 and P2 for sample and eluent solutions delivery respectively; two 6-port 2-position injection valves V1 and V2; a microcolumn C that is fixed at ports 1 and 4 of injection valve V1; and connecting tubes, wherein the tubes are preferably made of polytetrafluoroethylene (PTFE).

In one embodiment, the flow injection system for preconcentration and/or extraction of a target analyte from a sample comprises a microcolumn comprising the thiocyanatopropyl functionalized sol-gel silica sorbent of the subject invention, wherein the microcolumn is in fluid communication with first and second 6-port 2 position injection valves and a detector.

In one embodiment, the first and second 6-port 2 position injection valves control the directions of the sample, eluent solution and waste solution flowing through the system. In a preferred embodiment, the detector is ICP-AES or a part of ICP-AES such as the neutralizer of ICP-AES.

In one embodiment, the flow injection ICP-AES (FI/ICP-AES) system for preconcentrating and/or extracting of a target analyte comprises:
a first peristatic pump for introducing a sample;
a second peristatic pump for introducing an eluent solution;
first and second 6-port 2 position injection valves;
a microcolumn comprising the thiocyanatopropyl functionalized sol-gel silica sorbent of the subject invention; and
tubes that connect the first peristatic pump and the first 6-port 2 position injection valve, the first 6-port 2 position injection valve and the microcolumn, the first 6-port 2 position injection valve and the second 6-port 2 position injection valve, the second 6-port 2 position injection valve and the second peristatic pump, and the first 6-port 2 position injection valve and a neutralizer of ICP-AES so that the first and second 6-port 2 position injection valves, the microcolumn and the neutralizer of ICP-AES are in fluidic communication.

In preferred embodiments, the target analyte is a trace metal selected from, for example, Cd(II), Pb(II), Cu(II), Cr(III), Co(II), Ni(II), Zn(II), Mn(II), Hg(II), and V(II).

In one embodiment, the subject invention provides a method for detecting, determining, monitoring and/or extracting one or more trace metals from a sample, the method comprising:

passing the sample through the flow injection system of the subject invention;

passing an eluent solution through the flow injection system to obtain an eluent;

detecting one or more trace metals in the eluent; and optionally, quantifying the concentration of the one or more trace metals in the eluent.

In some embodiments, the quantification can be performed by ICP-AES, ICP-MS, ICP-OES, Graphite Furnace Atomic Absorption Spectroscopy or other metal detection and monitoring platform.

In one embodiment, the eluent solution is nitric acid having a concentration from about 0.01 mol/L to about 2.5 mol/L, from about 0.05 mol/L to about 2.5 mol/L, from about 0.1 mol/L to about 2 mol/L, from about 0.1 mol/L to about 1.5 mol/L, from about 0.2 mol/L to about 1.5 mol/L, from about 0.5 mol/L to about 1.5 mol/L, from about 1 mol/L to about 2 mol/L, or from about 1 mol/L to about 1.5 mol/L. In a preferred embodiment, the eluent solution is nitric acid having a concentration of 1 mol/L.

In one embodiment, the sample and/or the eluent solution passing through the flow injection system of the subject invention or the thiocyanatopropyl functionalized sol-gel silica sorbent has a loading flow rate (LFR), for example, from about 1 to about 50 mL/min, from about 1 to about 40 mL/min, from about 1 to about 30 mL/min, from about 2 to about 30 mL/min, from about 5 to about 25 mL/min, from about 5 to about 20 mL/min, from about 5 to about 15 mL/min, from about 5 to about 10 mL/min, from about 10 to about 40 mL/min, from about 10 to about 30 mL/min, from about 10 to about 20 mL/min, from about 1 to about 10 mL/min, or from about 1 to about 5 mL/min.

In one embodiment, the step of determining the concentration of the target analytes, e.g., trance metals, comprises comparing the detected result to a standard curve obtained by flowing standard solutions containing each target analyte or all target analytes at different concentrations through the flow injection system of the subject invention or the thiocyanatopropyl functionalized sol-gel silica sorbent.

In one embodiment, the subject invention provides a method for detecting, determining, monitoring and/or extracting one or more trace metals from an environmental water sample, the method comprising:

passing the environmental water sample through the flow injection system of the subject invention;

passing an eluent solution through the flow injection system to obtain an eluent;

detecting one or more trace metals in the eluent; and optionally, quantifying the concentration of the one or more trace metals in the eluent.

As used herein, the singular forms "a," "an," and "the" are intended to include the plural forms as well, unless the context clearly indicates otherwise. Further, to the extent that the terms "including," "includes," "having," "has," "with," or variants thereof are used in either the detailed description and/or the claims, such terms are intended to be inclusive in a manner similar to the term "comprising." The transitional terms/phrases (and any grammatical variations thereof), such as "comprising," "comprises," and "comprise," can be used interchangeably.

The phrases "consisting" or "consists essentially of" indicate that the claim encompasses embodiments containing the specified materials or steps and those that do not materially affect the basic and novel characteristic(s) of the claim. Use of the term "comprising" contemplates other embodiments that "consist" or "consisting essentially of" the recited component(s).

The term "about" or "approximately" means within an acceptable error range for the particular value as determined by one of ordinary skill in the art, which will depend in part on how the value is measured or determined, i.e., the limitations of the measurement system. For example, "about" can mean within 1 or more than 1 standard deviation, per the practice in the art. Alternatively, "about" can mean a range of up to 0-20%, 0 to 10%, 0 to 5%, or up to 1% of a given value. Alternatively, particularly with respect to biological systems or processes, the term can mean within an order of magnitude, preferably within 5-fold, and more preferably within 2-fold, of a value. Where particular values are described in the application and claims, unless otherwise stated the term "about" meaning within an acceptable error range for the particular value should be assumed. In the context of compositions containing amounts of concentrations of ingredients where the term "about" is used, these values include a variation (error range) of 0-10% around the value (X±10%).

EXAMPLES

Experimental Section
Reagents, Materials, and Samples

Tetramethyl orthosilicate (TMOS), hydrochloric acid and isopropanol were purchased from Sigma-Aldrich (St. Louis, Mo., USA). 3-Thiocyanatopropyl triethoxysilane was purchased from Gelest Inc. (Morrisville, Pa., USA).

Nitric acid ($HNO_3$) 65% and ammonia solution 25% of analytical grade were supplied by Merck (Darmstadt, Germany). Ultra-pure quality water was prepared by a Milli-Q purification system (Millipore, Bedford, Tex., USA) and used throughout the study. Stock standard solutions (1000 mg $L^{-1}$) of cadmium, chromium, copper, cobalt, nickel, lead, zinc, manganese, mercury, and vanadium were supplied by Merck (Darmstadt, Germany). The stock standard solutions were prepared in $HNO_3$ 0.5 mol $L^{-1}$ for cadmium, chromium, copper, cobalt, nickel, lead, zinc, manganese, and vanadium, and in $HNO_3$ 2.0 mol $L^{-1}$ for mercury. Working standard solutions were prepared daily by serial dilution from the stock standards. In order to avoid contamination, laboratory glassware and storage bottles were rinsed with water and soaked in 10% (v/v) nitric acid overnight to avoid decontamination. Prior to their use, all sample preparation apparatus was extensively washed with Milli-Q water.

The following standard reference materials were analyzed for evaluation of the developed method: A NIST certified reference material (CRM) 1643e (National Institute of Standard and Technology, Gaithersburg, Md., USA) containing trace elements in water; IAEA-433 (International Atomic Energy Agency, IAEA) marine sediment and Seronorm™ Trace Elements Urine L1. An amount of ca. 0.5 g of sediment certified reference material was precisely weighed into Teflon crucibles. Initially, it wetted by nitric acid, followed by addition of perchloric and hydrofluoric acids in a volume ratio of 3/2/1 ($HNO_3/HClO_4/HF$). Urine certified sample was digested using concentrated $HNO_3$. The digestion procedure was carried out at 130-140° C. in a shield Teflon beakers stainless-steel pressurized bomb, according to the manufacturer recommendations. After cooling the system, the digests were properly diluted in ultra-pure water and used for the analysis.

Environmental water samples were collected from sampling sites which are located in the Northern Greece during February 2021: Axios river and Volvi lake. All samples were filtered through 0.45 μm membrane filters, acidified to ca. pH 2 with dilute nitric acid and stored at 4° C. in acid-cleaned polyethylene bottles until the analysis. These solutions were used for the determination of the "dissolved" fraction of the metal in the samples.

Apparatus

Centrifugation of different sol solutions to obtain particle free gel was carried out in an Eppendorf Centrifuge Model 5415R (Eppendorf North America Inc., Framingham, Mass., USA). A 2510 BRANSON Ultrasonic Cleaner (Branson Inc., Brookfield, Conn., USA) was used to obtain bubble free sol solution prior to the gelation process. Ultra-pure deionized water (18.2 MΩ) used in the sol solution synthesis was obtained from a Barnstead NANOPure Diamond (Model D11911) deionized water system (APS Water Services Corporation, Lake Barbara, Calif., USA). An Agilent Carry 670 FT-IR Spectrometer equipped with Universal ATR Sampling Accessory (Agilent Technologies, Santa Clara, Calif., USA) was used to perform FT-IR characterization of the sol-gel sorbent. An JEOL JSM 5900 LV Scanning Electron Microscopy equipped with EDS-UTW Detector (Jeol USA Inc., Peabody, USA) was used to obtain SEM images as well as elemental composition analysis of the sol-gel sorbent.

All experiments were carried out using a Perkin-Elmer Optima 3100XL (www.perkinelmer.com) axial viewing inductively coupled plasma atomic emission spectrometer (ICP-AES) for the multi-element analysis, according to the operating conditions summarized in Table 1. Optima 3100XL analytical instrument was equipped with an Echelle polychromator (resolution: 0.006 nm at 200 nm) and a segmented-array charge-coupled (SCD) 235 sub-arrays detector. Two different spray-chamber/nebulizer configurations namely: Cyclonic/Babington and Scott double-pass/Gem tip crossflow, were tested in for their efficiency evaluation by means of sensitivity. The studied elements and the analytical wavelengths were set at the first and second sensitivity order spectral atomic (I) or ionic (II) lines of analytes, listed in Table 1.

TABLE 1

Instrumental conditions and description of the ICP-AES system

| Parameter | Value/Description |
|---|---|
| RF generator | 40 MHz, free-running |
| RF Incident Power | 1400 W (optimized) |
| Viewing mode | Axial |
| Torch | Fassel type |
| Injector, i.d. | Quartz glass, 2.0 mm |
| Spray Chamber | Cyclonic type (optimized) |
| Nebulizer | Babington type (optimized) |
| Auxiliary Ar gas flow rate | 0.6 L min$^{-1}$ |
| Plasma gas Ar flow rate | 15.0 L min$^{-1}$ |
| Nebulizer Ar gas flow rate | 0.85 L min$^{-1}$ |
| Waste uptake flow rate | 3.5 mL min$^{-1}$ |

TABLE 1-continued

Instrumental conditions and description of the ICP-AES system

| Target analytes | Spectral lines (nm) |
|---|---|
| Cd | 214.440(II)/228.802(I) |
| Co | 228.616(II)/238.892(II) |
| Cr | 283.563(II)/357.869(I) |
| Cu | 324.752(I)/224.700(II) |
| Hg | 253.652(I)/302.150(I) |
| Mn | 257.610(II)/259.372(II) |
| Ni | 232.003(II)/221.648(II) |
| Pb | 220.353(II)/217.000(I) |
| Zn | 213.857(I)/202.548(II) |
| V | 292.402(II)/309.310(II) |

To determine accurate peak wavelengths on Peak Algorithm, Peak Area processing was chosen. Due to the transient concentration of analyte into the segment of eluent, during the elution/measurement step, read time of 1 s and 10 replicates were adopted for signal recording. The selection of the emission line was based on their sensitivity in combination with the absence of spectral interferences.

The flow injection system for the on-line column preconcentration of the target analytes coupled with the ICP-AES is shown schematically in FIG. 2. In brief, it consisted of two peristatic pumps $P_1$ and $P_2$ (Gilson minipuls 3) for sample and eluent solutions delivery respectively, as well as of two 6-port 2-position injection valves $V_1$ and $V_2$ (Labpro, Reodyne, USA). The microcolumn C was fixed at ports 1 and 4 of injection valve V1. All tubing of the flow manifold were made of polytetrafluoroethylene (PTFE). The connecting tube between the $V_1$ and the nebulizer of ICP-AES was as short as possible, (50 cm length, 0.5 mm internal diameter) to eliminate possible dispersion of the analytes into the segment of the eluent.

A METROHM 654 pH-meter (METROHM AG, Herisau, Switzerland) was employed for the pH adjusting of sample solutions.

Construction of the Repacked Microcolumn

The microcolumn was constructed from a polypropylene 1.0 mL disposable syringe (length 10 cm; i.d. 5.0 mm) with luer slip centered tip. The main body of syringe was cut properly at a length ca. 15.0 mm, thus the resulted repacked-microcolumn had an effective length varied from 5.0 to 10.0 mm and a internal diameter of 5.0 mm offering limited backpressure. An amount of 120 mg of sol-gel thiocyanatopropyl silica sorbent was firmly packed into the column and blocked by commercial frits at both ends for the sorbent immobilization, as it is shown in FIG. 1 Push-fit connections were used to install the microcolumn in the FI manifold, at ports 1 and 4 of the injection valve $V_1$ (FIG. 2).

This configuration facilitated rapid replacement and re-packing of the micro-column, whenever required, thereby overcoming the deterioration of the analytical performance of the method due to the progressive deactivation of the sorbent material. Prior to the utilization of a fresh column, the sol-gel thiocyanatopropyl silica sorbent was flushed with 1.0 mol $HNO_3$ and deionized water.

The arrangement of the microcolumn ensured the simple and stable flow of the sample solution and the eluent through the sorbent. As a result, effective contact between the novel sol gel sorbent and the target analytes was achieved. The microcolumn packed with sol-gel thiocyanatopropyl silica sorbent, was proven to operate reliably for at least 700 sorption/elution cycles.

Synthesis 3-Thiocyanatopropyl Functionalized Sol-Gel Silica Sorbent

The sol solution was prepared by sequential addition of tetramethyl orthosilicate (TMOS), 3-thiocyanatopropyl triethoxysilane and 2-propanol in a 50 mL amber reaction bottle at a molar ratio of 1:0.3:15, respectively with vortexing for 2 min after adding each ingredient. Subsequently, 0.1M HCl was added to the mixture at a molar ratio between TMOS and 0.1M HCl 1:5. After thorough mixing of the sol solution, the mixture was subjected to prolonged hydrolysis at 50° C. for 8 h. The solution was then transferred into a wide mouth glass reaction vessel and a Teflon coated bar magnet was added to it. In order to initiate polycondensation, 1 M $NH_4OH$ (impregnated with 0.25M $NH_4F$) was added in droplets under constant stirring on a magnetic stir bar. The ratio between TMOS and 1M $NH_4OH$ was maintained at 1:1.2). The sol solution was turned into transparent gel in 30 min. The sol-gel monolithic bed was thermally conditioned and aged for 24 h at 50° C.

Subsequently, the monolithic bed was crushed and dried for 24 h at 70° C. The dried sol-gel sorbent was then crushed and pulverized into fine particles using a mortar and a pestle. To clean the sol-gel sorbent from unreacted precursors, solvent and reaction-by products, the powder was loaded in a fiber-glass thimble and subjected to Soxhlet extraction for 4 h using methanol: methylene chloride 50:50 (v/v) as the cleaning solution. The sol-gel sorbent was then dried at 70° C. for 24 h. The dried sol-gel sorbent was then ready for upstream processing such as characterization and application.

Figure 3:
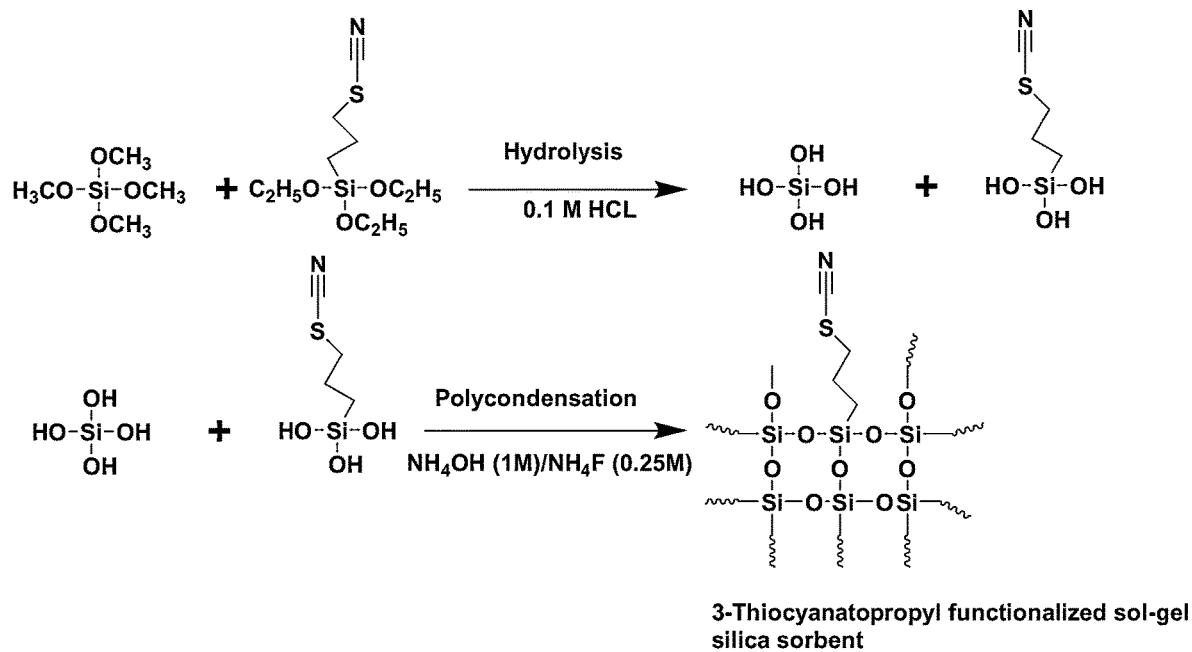
FIG. 3 shows reaction Schemes for Formulation 1.
Figure 4:
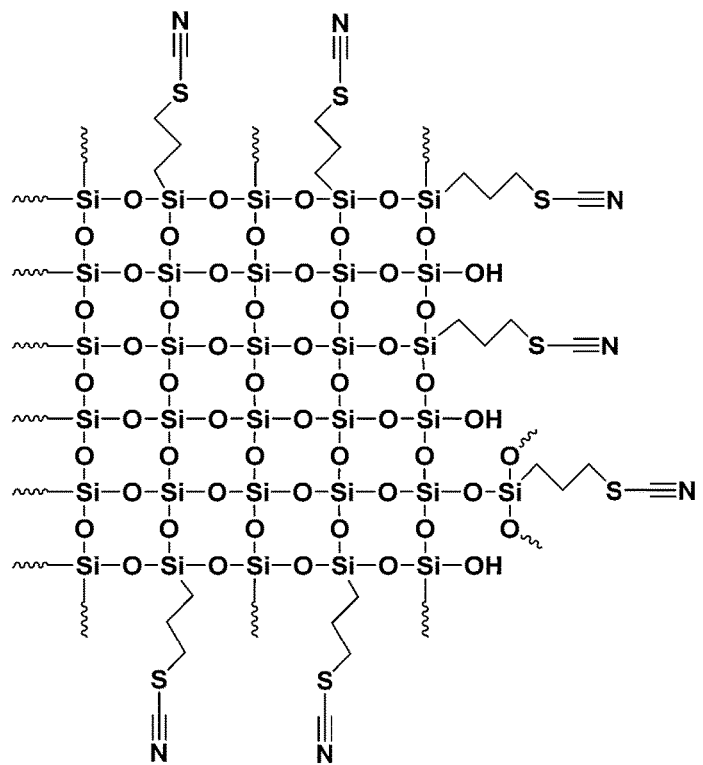
FIG. 4 shows the thiocyanatopropyl functionalized sol-gel silica sorbent.

An exemplary formulation of 3-Thiocyanatopropyl Functionalized sol-gel silica sorbent is shown below in Table 2. The reaction scheme for formulation 1 is shown in FIG. 3. The resulting thiocyanatopropyl Functionalized sol-gel silica sorbent is shown in FIG. 4.

TABLE 2

Formulation 1 of thiocyanatopropyl Functionalized sol-gel silica sorbent

| Compound | Volume |
| --- | --- |
| Tetramethyl Orthosilicate: | 10,000 μL |
| 3-Thiocayanatopropyl triethoxysilane | 5,000 μL |
| Isopropanol: | 75,000 μL |
| HCl (0.1M) | 5,900 μL |
| Hydrolysis overnight at 50° C. | |
| 1M $NH_4OH$ (0.25M $NH_4F$) | 1,000 μL |

Figure 5:
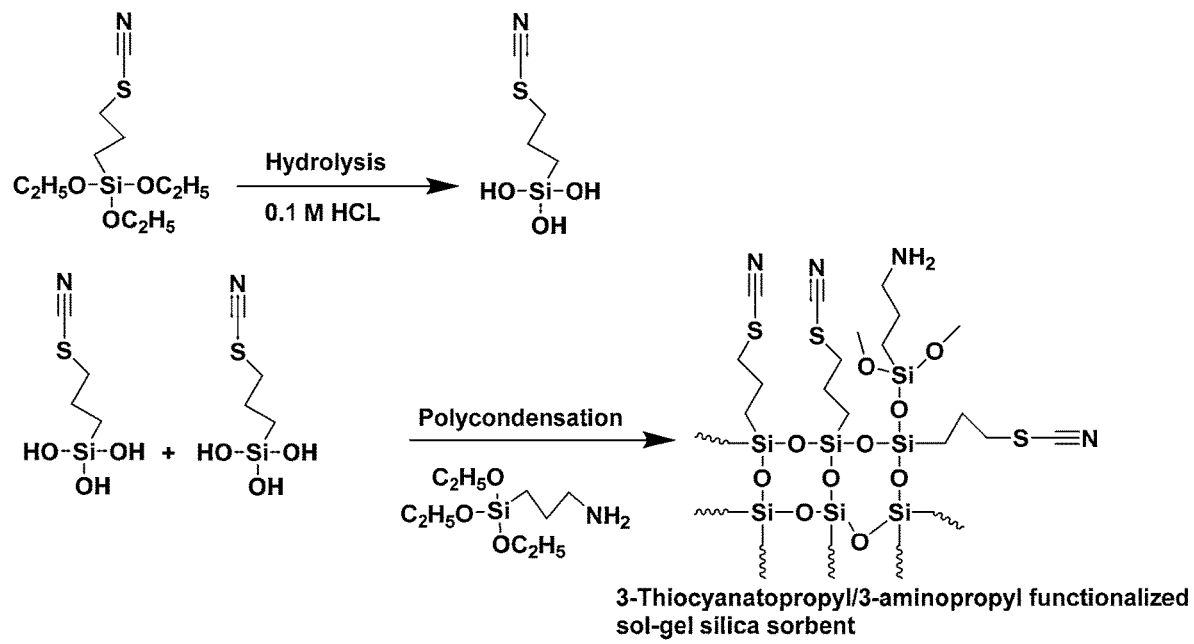
FIG. 5 shows reaction Schemes for Formulation 2.

Formulation for condensed 3-thiocyanatopropyl/3-aminopropyl functionalized sol-gel silica sorbent is shown in Table 3 (Formulation 2). The reaction scheme for formulation 2 is shown in FIG. 5.

TABLE 3

Condensed 3-Thiocyanatopropyl/3-Aminopropyl Functionalized sol-gel silica sorbent.

| Compound | Volume |
| --- | --- |
| 3-Thiocyanatopropyl triethoxysilane | 5,000 uL |
| Isopropanol: | 25,000 uL |
| HCl (0.1M) | 1,100 uL |
| Hydrolysis overnight at 50° C. | |
| 3-Aminopropyl trimethoxysilane | 1500 uL |

Automatic On-Line Operational Procedure

The automatic on-line flow injection microcolumn preconcentration analytical procedure for the multielement determination was operated in four main steps, which are presented in Table 4.

TABLE 4

Operation sequences of the on-line microcolumn preconcentration system coupled with ICP-AES

| Step | $V_1$ | $V_2$ | P1 | P2 | Delivered medium | Flow rate (mL min$^{-1}$) | Time (s) | Operation |
| --- | --- | --- | --- | --- | --- | --- | --- | --- |
| Pre-fill | Elute | A | on | on | Sample or standard solution | 10.0 | 10 | Preconcentration |
| 1 | Load | A | on | on | Sample or standard solution & Water | 10.0 | 50 | Preconcentration |
| 2 | Load | B | on | on | Sample or standard solution & 1.0 mol L$^{-1}$ $HNO_3$ | 10.0 & 2.6 | 10 | Preconcentration & Plasma equilibration with eluent flow |
| 3 | Elute | B | off | on | 1.0 mol L$^{-1}$ $HNO_3$ | 2.6 | 30 | Elution/Measurement |
| 4 | Elute | A | off | on | 1.0 mol L$^{-1}$ $HNO_3$ | 2.6 | 10 | Microcolumn neutralization |

In case of a new sample or standard solution was introduced for the first time, a pre-fill step was used prior sample loading (step 1), to flush the tubing of the peristaltic pump (P1) up to port 6 of the injection valve (V1).

In preconcentration steps (step 1 and 2, FIG. 2), injection valve V1 was in "load" position and pump P1 was activated for sample or standard solution transportation trough the microcolumn at a fixed flow rate of 6.4 mL L-1 for a preconcentration time of 60 s. The analytes ions were quantitatively adsorbed on the sol-gel material of the microcolumn. In the elution step (step 3), the injection valve V1 switched in "elute" position and the eluent solution (1.0 mol L-1 HNO3) was propelled by pump P2 through the microcolumn to elute the retained analytes and to deliver them directly into ICP for quantification.

A time of 30 s was found to be adequate for complete elution. It is noteworthy that the eluent flows through the microcolumn in reverse direction than that of the sample or standard solution resulting in minimum dispersion of the analytes into the eluent segment. By this way, gradual compaction of the sorbent material was also avoided. Mean value of five replicate measurements per assay was used in method development

Example 1-Characterization of the Sol-Gel Thiocyanatopropyl Functionalized Silica Sorbent To understand the functional and elemental composition as well as the surface morphology of the particles, thiocyanatopropyl functionalized sol-gel silica particles were characterized using Fourier Transform-Infrared Spectroscopy (FT-IR) and Scanning Electron Microscopy-Energy Dispersive Spectrometry (SEM-EDS).

Fourier Transform-Infrared Spectroscopy Analysis

Figure 6:
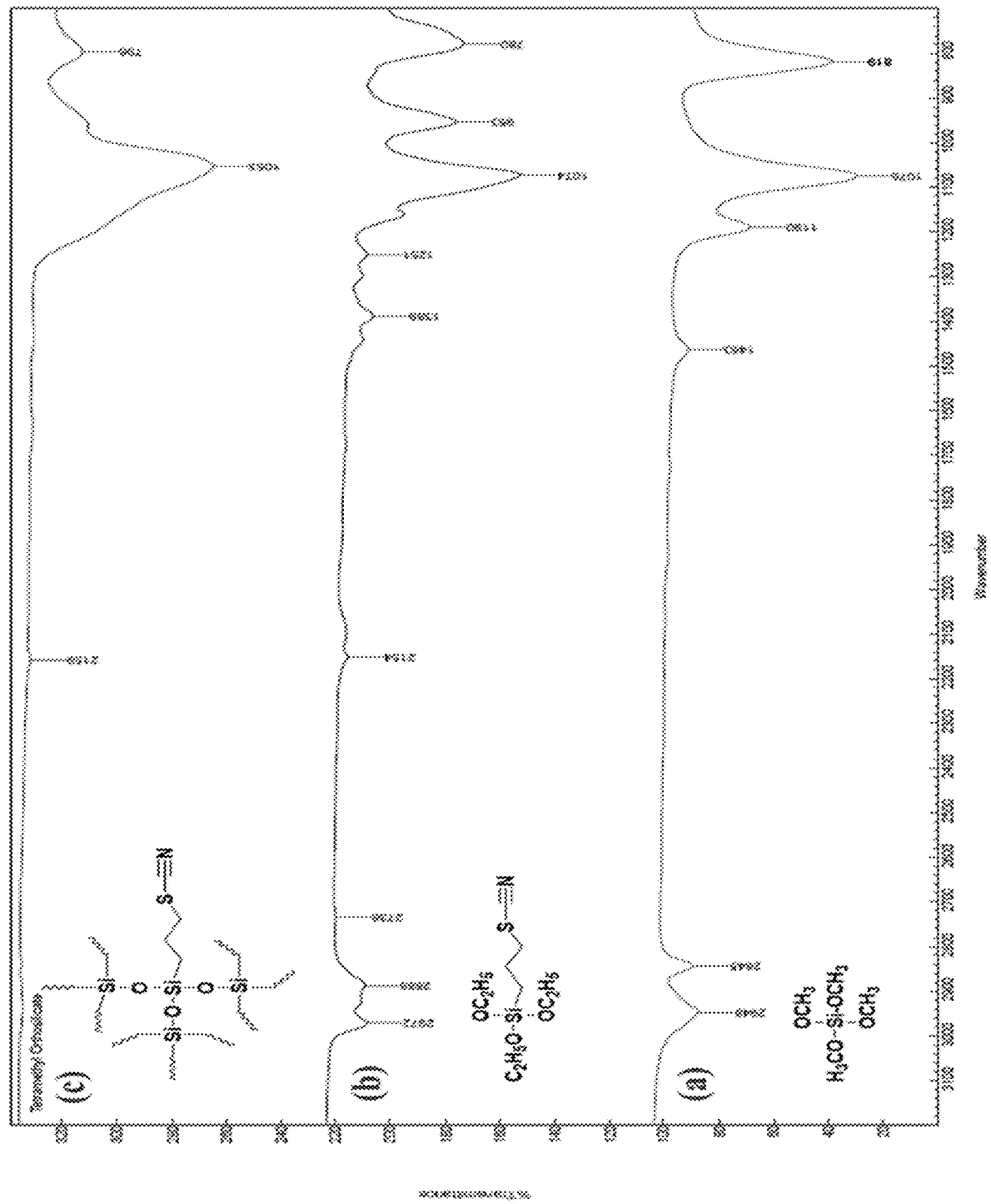
FIGS. 6A-6C show FT-IR spectra of (a) tetramethyl orthosilicate (TMOS); (b) 3-thiocyanatopropyl triethoxysilane; and (c) 3-thiocyanatopropyl functionalized sol-gel silica sorbent.

FIGS. 6A-6C depict the FT-IR spectra of (a) tetramethyl orthosilicate (TMOS); (b) 3-thiocynatopropyl trimethoxysilane (3-TCPTMS); and (c) 3-thiocyanatopropyl functionalized sol-gel silica sorbent. The dominant features of the TMOS FT-IR spectra include bands at 2948 $cm^{-1}$ and 2845 $cm^{-1}$, which correspond the asymmetric and symmetric vibrations of —CH2-, —CH2- groups, respectively. The bands at 1463 $cm^{-1}$ and 1076 $cm^{-1}$ correspond to the vibration absorption of Si—O—C and Si—O—Si, respectively. The band at 819 $cm^{-1}$ is attributed to Si—C bonds. Major characteristic features of 3-TCPTMS FT-IR spectra include bands at 2972 $cm^{-1}$, 2157 $cm^{-1}$ and 780 $cm^{-1}$, which are attributed to the C—H stretching vibration of CH2 group, the C N stretching vibration and the C—S stretching vibration of thiocyanatopropyl functional group. The presence of bands at ~2115 $cm^{-1}$, ~1063 $cm^{-1}$ and ~796 $cm^{-1}$ in both the 3-TCPTMS and 3-thiocyanopropyl functionalized sol-gel silica FT-IR spectra convincingly suggests the successful integration of 3-thiocyanopropyl functional groups into the 3D sol-gel silica network.

Scanning Electron Microscopy-Energy Dispersive Spectrometry (SEM-EDS) Analysis

Figure 7:
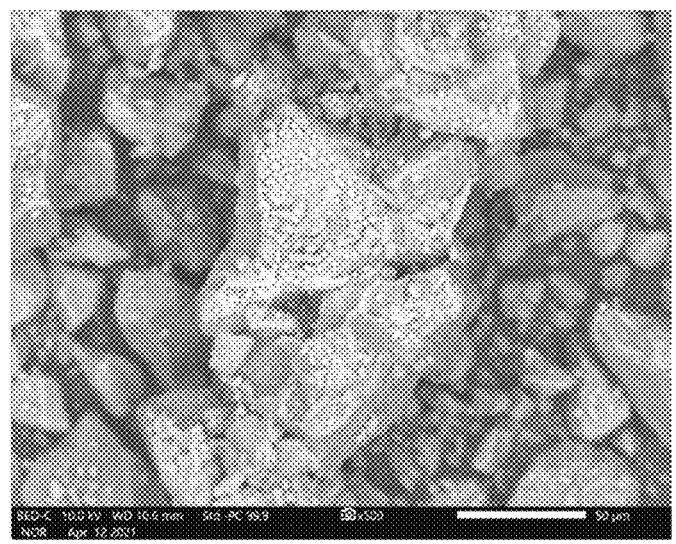
FIG. 7 shows the SEM-EDS image of 3-thiocyanatopropyl functionalized sol-gel silica particles (at 5,00× magnification).

Scanning electron microscopy image presented in FIG. 7 reveals the rough surface morphology of 3-thiocyanopropyl functionalized sol-gel silica. As the particles were obtained by manual grinding of a monolithic bed using a mortar and pestle, the particles are not homogeneous in size and shape. A mechanical grinder may provide monodisperse particle size of the functional silica sorbent. The elemental analysis of sol-gel silica sorbent using EDS revealed the composition as 48.09% Si, 47.13% 0, 3.11% S and 1.67% N. The percentage of S and N in the sorbent can be easily enhanced by adding higher molar ratio of 3-TCPTMS in the sol solution or using only 3-TCPTMS as a single sol-gel precursor in the sol solution formulation.

Example 2—Tentative Mechanism of Extraction

Figure 8:
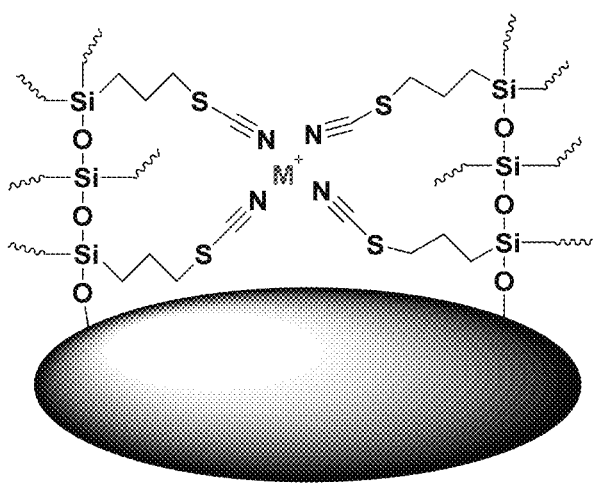
FIG. 8 shows the schematic demonstration of the interaction between 3-thiocyanatopropyl functionalized sol-gel silica sorbent.

Thiocyanate functional group is known to possess strong affinity towards d-block elements. FIG. 8 depicts a schematic representation of the sol-gel sorbent with metal ions (M+). It can interact with the metal ions either through nitrogen atom (known as isothiocyanate binding mode) or through sulfur atom (known as thiocyanate binding mode)]. Y. V. Maveichuk at al. (2015) have conducted a detailed study on a group of d-block elements to understand as to how individual element interacts with thiocyanate moiety and experimentally proved that $Zn^{2+}$ and $Co^{2+}$ interact with thiocyanate via nitrogen whereas $Hg^{2+}$, $Mn^{2+}$, $Cd^{2+}$, $Fe^{2+}$ interact with thiocyanate via sulfur atom. As such, thiocyanatopropyl functional group appears to possess a universal affinity towards the d-block elements. When the analytical challenge is to indiscriminately isolate and separate all these elements from the aqueous solution as in the case of wastewater treatment plants, water filtration units and other water treatment processes, 3-thiocyanaopropyl functionalized sol-gel silica sorbent may be an ideal choice.

Example 3—Optimization of the ICP-AES Parameters

Between the two most sensitive emission spectral lines (Table 1), those with the higher slope of the calibration curves, for each analyte, are adopted for further study namely: Cd 228.802 nm; Co 238.892 nm; Cr 357.869 nm; Cu 324.752 nm; Hg 302.150 nm; Mn 257.610 nm; Ni 232.003 nm; Pb 220.353 nm; Zn 213.857 nm; V 309.310 nm.

Experiments were carried out to evaluate two different configurations of nebulization systems by means of increased sensitivity. Cyclonic spray chamber integrated with a Babington-type nebulizer and Scott double-pass spray chamber with a cross-flow nebulizer are the most widely used configurations used in ICP-AES. Higher emission signals were obtained by Cyclonic/Babington configuration for all analytes using the proposed on-line microcolumn preconcentration system. This combination exhibits higher analyte mass transportation into the plasma due to cyclonic spray chamber's capability to manipulate larger amounts of the sample solution.

The radio frequency (RF) incident power and the nebulizer gas flow rate are two main parameters that significantly affect the analytical performance of the ICP-AES. The effect of RF power on the emission intensity for each element was examined between 1200-1400 W. It is known that the RE power has a positive effect on the plasma temperature. Thus, the increase of RF power can result in higher intensities for the recorded emission lines. It was observed that the emission intensity increased by increasing the RF power up to 1400 W for all studied elements. On the contrary, plasma extinction occurred for RF values lower than 1200 W. As a result, further experiments were conducted at a RF incident power of 1400 W. Subsequently, the effect of the nebulizer gas flow rate on the emission intensity was investigated in the range 0.6-1.0 L $min^{-1}$. It was observed that an increase of the flow rate up to 0.85 L $min^{-1}$ enhanced the recorded emission intensity for all analytes. Thus, nebulizer gas flow rate of 0.85 L $min^{-1}$ was chosen for the experimental procedure.

Example 4—Optimization of the FI-ICP-AES System

For the optimization of the flow injection ICP-AES (FI/ICP-AES) system presented in FIG. 2, the main chemical and hydrodynamic parameters affecting its performance were thoroughly investigated and optimized using the well-established one-variable-at-a-time (OVAT) approach. As such, each parameter was individually examined within a studied range, while all other factors remained constant. For this purpose, a multi-element standard solution containing all studied analytes at a concentration of 25 µg was used throughout the experiments.

Figure 9:
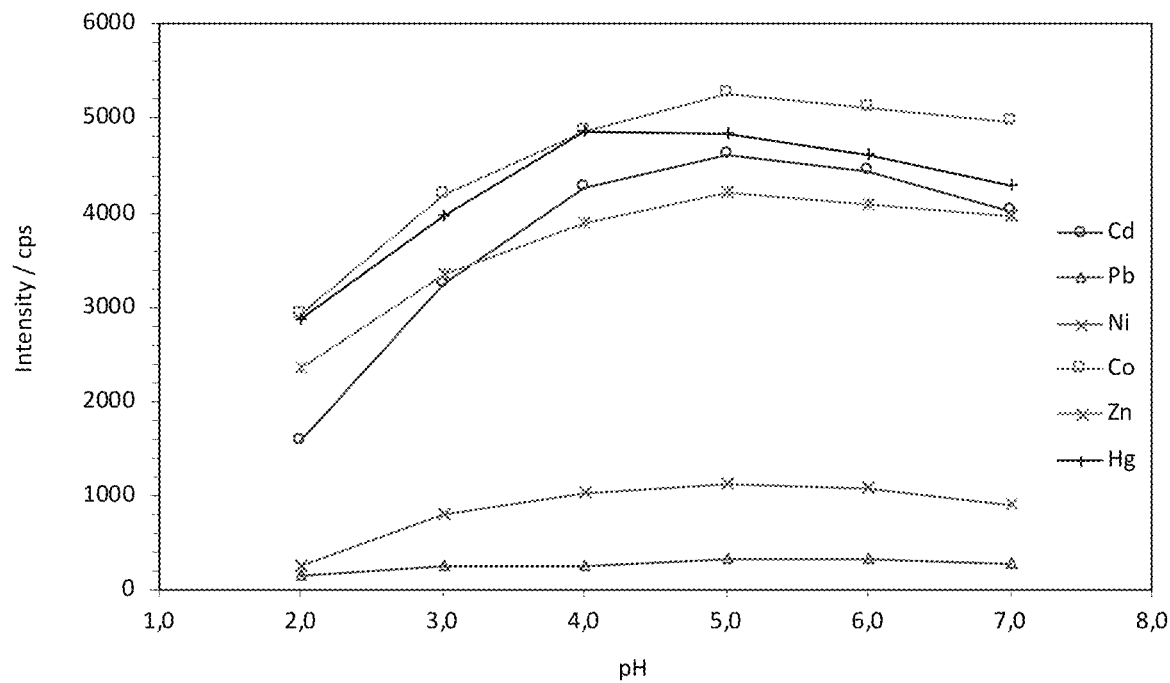
FIG. 9 shows the effect of pH on the emission intensity of Cd, Co, Ni, Zn, Pb and Hg at 25 µg $L^{-1}$ concentration level of each metal ion. All other experimental parameters are presented in Table 1.
Figure 10:
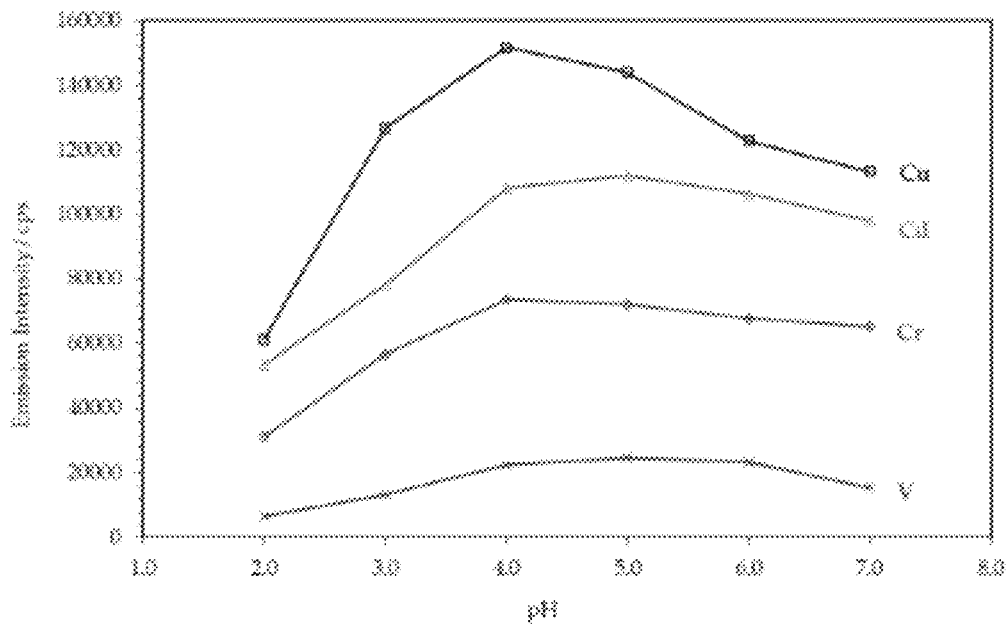
FIG. 10 shows the effect of pH on the emission intensity of Cu, Cr, Mn, and V at 25 µg $L^{-1}$ concentration level of each metal ion. All other experimental parameters are presented in Table 1.

The chemical parameters include the pH value of the sample solution, the type, and the concentration of the eluent. The pH of the sample is an important factor that significantly affects the performance of on-line column preconcentration procedure. A suitable pH value improves the retention efficiency and, in many cases, reduces the matrix interference. The pH value of the sample was investigated in the range of 2.0 to 7.0 by adjusting it with dilute $HNO_3$ and NaOH solutions. The experimental results are shown in FIG. 9 for Cd, Co, Ni, Pb, Zn, Hg and in FIG. 10 for Cu, Cr, Mn and V. As it can be observed, the emission intensity was increased by increasing the pH and the extraction efficiency was decreased significant at pH lower than 4 for all analytes. The emission intensity of the studied metal ions was highest at pH range 4.0 to 6.0, while at higher pH values the signal was gradually decreased, because of possible hydrolysis phenomena. As a compromise, a pH value of 5.0 was adopted for further experiments since it was found to be beneficial for most of the target analytes.

The elution procedure of the analytes from the sol-gel thiocyanatopropyl silica micro-column is of a great importance to avoid carry-over effects that could limit the applicability of the sorbent material due to incomplete desorption of the retained analytes. Since the retention efficiency of the analytes was decreased sharply at low pH values, nitric and hydrochloric acid were examined as eluents. However, the utilization of hydrochloric acid did not seem beneficial because it could form salts with some of the target analytes (e.g., mercury and lead) which could sediment in the micro-column and block the functional groups of the sorbent as well as the frits of the column. Nitric acid was an efficient eluent which could successfully elute all retained metal ions in very small volume (segment of eluent zone). In addition, it is fully compatible with the nebulizer and the injector of ICP atomization system. Various nitric acid concentrations between 0.1 to 2.0 mol $L^{-1}$ were examined. As it was observed the emission intensity increased by increasing the nitric acid concentration up to 1.0 mol $L^{-1}$ and then was leveled off. Thus, a solution 1.0 mol $HNO_3$ was used as eluent during the elution step (Table 4).

Figure 11:
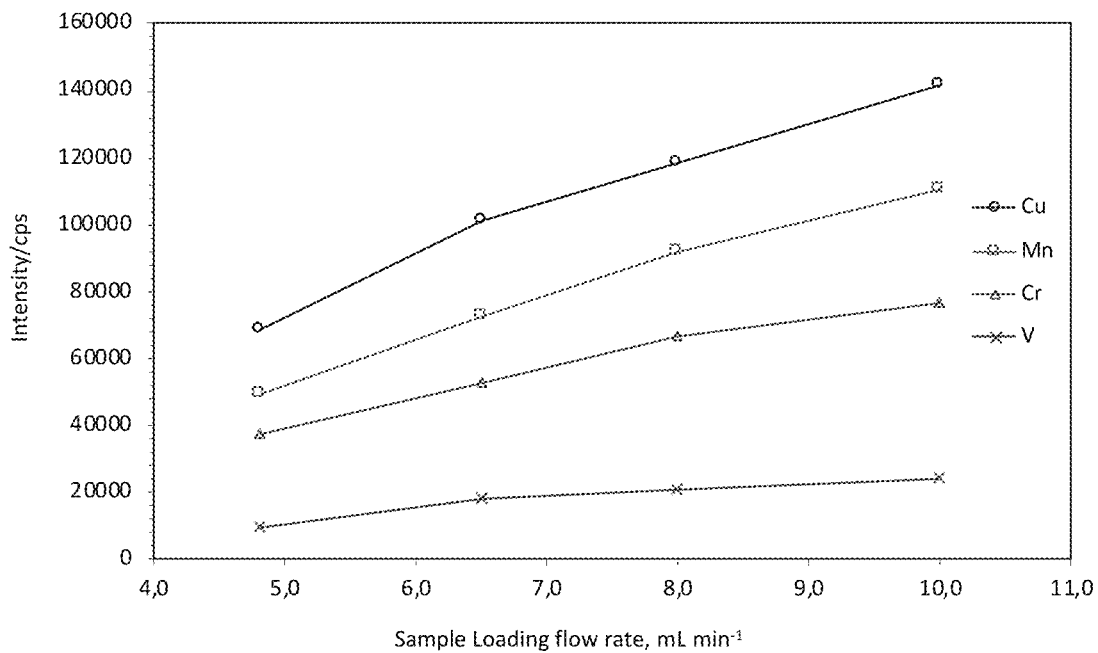
FIG. 11 shows the effect of loading flow rate on the emission intensity of Cu, Cr, Mn and V at 25 µg $L^{-1}$ concentration level each metal ion. All other experimental parameters as presented in Table 1.

A key factor that significantly affects the performance of on-line column preconcentration systems is the loading flow rate (LFR). For a specific time (preconcentration time), LFR determines the volume of sample solution that takes place in the extraction procedure. Although high flow rates are typically desired to achieve high preconcentration factors, adverse phenomena might take place by increasing the flow rate due to column back-pressure that can negatively impact the sorption efficiency. The effect of LFR on the emission intensity of target ions was studied in the rage 5.0-10.0 mL $min^{-1}$. As shown in FIG. 11, the recorded signal increased practically linearly by increasing the LFR for all analytes indicating that the adsorption kinetics of the sol-gel thiocyanatopropyl silica sorbet is very effective for the studied ions.

For further experiments, a sample loading flow rate of 10.0 mL $min^{-1}$ was adopted as a compromise considering the sensitivity the sample consumption and the time of analysis of the on-line FI/ICP-AES method.

The eluent flow rate (EFR) affects the efficiency of the elution of the adsorbed metal ions and the dispersion of the analytes into the eluent zone. Moreover, EFR contributes to the nebulization and atomization process since it defines the amount of analyte mass injected into ICP.

The effect of nitric acid flow rate was examined in the range 1.0 to 3.0 mL $min^{-1}$ for a fixed elution time of 30 s (Table 4). The experimental results for all studied analytes shown that the recorded signals were increasing up to 2.6 mL $min^{-1}$ and leveled off for higher flow rate. Hence, a flow rate of 2.6 mL $min^{-1}$ was adopted for further experiments.

Figure 12:
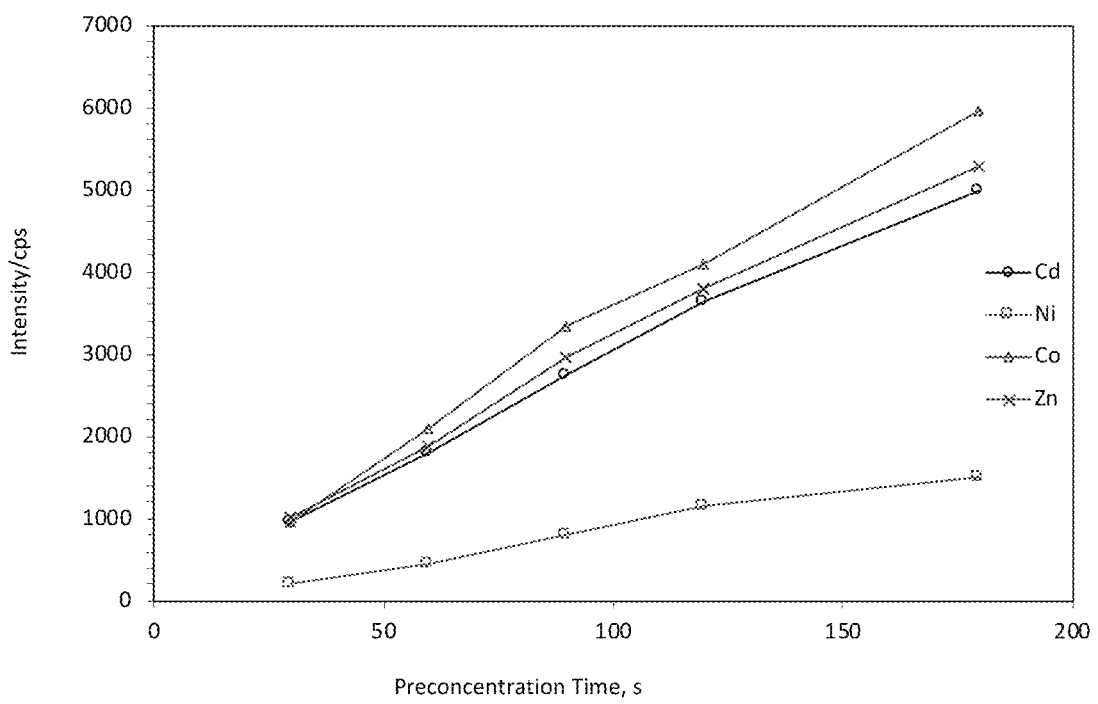
FIG. 12 shows the effect of preconcentration time on the emission intensity for Cd, Co, Ni and Zn at 10.0 µg $L^{-1}$ concentration level each metal ion. All other experimental parameters as presented in Table 1.

The on-line flow injection column preconcentration systems are based on the loading time to increase the sensitivity and the enhancement factor (EF). The influence of the loading time (preconcentration time) on the recovery of the metal ions was examined by loading a standard solution containing all target analytes for preconcentration times between 30 s to 180 s. The obtained results (FIG. 12) revealed a practical proportionate increase for all metals by increasing the preconcentration time up to 180 s. As a compromise between high sensitivity and low time of analysis and sample consumption, a preconcentration time of 60 s was selected. However, it must be noted that if higher sensitivity is required, the preconcentration time can be prolonged based on the needs of the analysis.

Example 5—Effect of Co-Existing Ions

The effect of common co-existing ions on the sensitivity of the proposed FI/ICP-AES method for the determination of the studied metal was studied. So a multi-element aqueous solution containing Cd(II), Co(II), Cr(III), Cu(II), Mn(II), Ni(II), Pb(II), Zn(II), Hg(II) and V(II) at 10.0 µg $L^{-1}$ concentration level of each metal and the added interfering ions was analyzed according to the developed analytical procedure.

The variation of the signal emission intensity greater than +5% was adopted as interference of the co-existing ions. The tolerance limit for the common matrix co-existing ions was: $Na^+$, $K^+$ up to 1000 mg $L^{-1}$; $Ca^+$ Mg up to 500 mg $L^{-1}$; $SO_4^{2-}$, $NO_3^-$, $HCO_3^-$ up to 2000 mg $L^{-1}$ and $Ag^+$, $Al^{3+}$, $Ba^{++}$, $Fe^{3+}$ up to 20 mg $L^{-1}$ As the presence of the co-existing ions in most natural water samples are much lower than the concentration levels studied above, the method of the subject invention can be used for multi element determination in most cases of environmental water samples without applying any masking agent.

Example 6—Figures of Merit

The analytical performance characteristics of the herein developed method for each metal ion, under the optimized operating conditions and a preconcentration time of 60 s, are presented in Table 5. The sampling frequency of the automatic FI/ICP-AES method was 50 $h^{-1}$. The enhancement factor calculated by the ratio of the slopes of calibration curves with and without preconcentration (given in Table 5). As it can be observed, the enhancement factors ranged between 31 and 53 for the target analytes. The linearity for the proposed method was assessed by linear regression analysis through the construction of calibration curves for multi-element standard solutions subjected to the FI/ICP-AES method.

As it can be observed, the proposed method exhibited good linearity and a wide linear range for all the examined elements. The detection and quantification limit are calculated by 3 s and 10 s criterion respectively, according to IUPAC recommendation, as 3- or 10-times the standard deviation of the blank solution measurements (n=10) divided by the slope of the corresponding calibration equation. For the target analytes, the LOD values ranged between 0.05-0.24 μg $L^{-1}$, while the LOQ values ranged between 0.17-0.79 μg $L^{-1}$. The precision of the method was expressed in terms of relative standard deviation (RSD %) for each examined metal at 10.0 μg $L^{-1}$. (n=8) concentration level were ranged between 0.8% and 7.9%.

TABLE 5

Figures of merit of the proposed FI/ICP-AES method (for 60s preconcentration time)

| | Cd(II) | Co(II) | Cr(III) | Cu(II) | Mn(II) | Ni(II) | Pb(II) | Zn(II) | Hg(II) | V(II) |
|---|---|---|---|---|---|---|---|---|---|---|
| Enhancement factor | 53 | 35 | 46 | 34 | 36 | 36 | 46 | 34 | 39 | 31 |
| Linear range (μg $L^{-1}$) | 0.33-100 | 0.17-80 | 0.44-80 | 0.20-100 | 0.26-50 | 0.49-80 | 0.79-100 | 0.33-80 | 0.62-80 | 0.18-80 |
| Correlation coefficient (r) | 0.9993 | 0.9981 | 0.9954 | 0.9978 | 0.9984 | 0.9993 | 0.9985 | 0.9988 | 0.9986 | 0.9992 |
| Sensitivity (slope), $\mu g^{-1}$ L | 169.0 | 197.6 | 3323.9 | 5206.1 | 4072.5 | 38.8 | 11.4 | 160.1 | 199.7 | 911.3 |
| Detection limit (3s), μg $L^{-1}$ | 0.10 | 0.05 | 0.13 | 0.06 | 0.08 | 0.15 | 0.24 | 0.10 | 0.18 | 0.05 |
| Quantification limit (10s), μg $L^{-1}$ | 0.33 | 0.17 | 0.44 | 0.20 | 0.26 | 0.49 | 0.79 | 0.33 | 0.62 | 0.18 |
| Precision (RSD, n = 8), % | 3.9 | 2.6 | 0.8 | 1.6 | 2.0 | 2.2 | 7.9 | 2.5 | 1.7 | 2.9 |
| Slope (without preconcentration), μg $L^{-1}$ | 3.18 | 5.68 | 72.33 | 155.38 | 112.93 | 1.07 | 0.25 | 4.76 | 5.16 | 29.22 |

The accuracy of the subject FI-/ICP-AES on-line microcolumn preconcentration method for the determination of each metal was examined by analyzing three certified reference materials: CRM 1643e, IAEA-433 and Seronorm™ Trace Elements Urine Level 1 (4) and it was expressed in terms of relative error between the nominal and experimentally found concentration. As the certified values of cadmium and mercury in Seronorm™ were below the detection limits, they were not evaluated. Student t-test was used in order to be investigated if there is statistically significant difference between the certified values and the recorded analytical values of the studied metals in the certified reference materials. The calculated $t_{exp}$, values for each metal are given also in Table 6. All the $t_{exp}$, values are lower than the critical value $t_{crit,\ 95\%}$=4.3, meaning that no statistically significant differences were observed for each analyte at a 95% probability level and the method exhibited satisfactory accuracy.

TABLE 6

Determination of trace metals in certified reference materials with the proposed FI/SPE-ICPAES method.
Mean value ± standard deviation based on three replicates (n = 3), $t_{exp}$,
Experimental value, $t_{crit}$ = 4.3 (at 95% probability level).

| Certified Reference Material | Cd | Co | Cr | Cu | Hg | Mn | Ni | Pb | Zn | V |
|---|---|---|---|---|---|---|---|---|---|---|
| CRM 1643e (Trace Element Water) | | | | | | | | | | |
| Certified value (μg $L^{-1}$) | 6.568 ± 0.073 | 27.06 ± 0.32 | 20.4 ± 0.24 | 22.76 ± 0.31 | — | 38.97 ± 0.45 | 62.41 ± 0.69 | 19.63 ± 0.21 | 78.5 ± 2.2 | 37.86 ± 0.59 |
| Found* (μg $L^{-1}$) | 6.2 ± 0.3 | 26.3 ± 1.2 | 19.1 ± 1.4 | 21.9 ± 1.2 | — | 40.2 ± 2.1 | 64.7 ± 3.9 | 18.5 ± 1.3 | 80.3 ± 4.6 | 36.2 ± 2.4 |
| Relative Error | −5.6 | −2.8 | −6.4 | −3.8 | — | 3.2 | 3.7 | −5.8 | 2.3 | −4.4 |
| $t_{exp}$*** | 1.99 | 1.10 | 1.61 | 1.24 | — | −1.01 | −1.02 | 1.51 | −0.68 | 1.20 |
| IAEA-433 (Marine sediment) | | | | | | | | | | |
| Certified value (mg $kg^{-1}$) | 0.153 ± 0.033 | 12.9 ± 1.2 | 136 ± 10 | 30.8 ± 2.6 | 0.338 ± 0.017 | 316 ± 16 | 39.4 ± 3.1 | 26.0 ± 2.7 | 101 ± 8 | 160 ± 11 |
| Found* (mg $kg^{-1}$) | 0.15 ± 0.01 | 12.4 ± 0.6 | 134 ± 7 | 32.0 ± 1.9 | 0.31 ± 0.03 | 304 ± 12 | 37.8 ± 2.4 | 27.1 ± 1.7 | 99 ± 3.1 | 151 ± 11 |

TABLE 6-continued

Determination of trace metals in certified reference materials
with the proposed FI/SPE-ICPAES method.
Mean value ± standard deviation based on three replicates (n = 3), $t_{exp.}$,
Experimental value, $t_{crit}$ = 4.3 (at 95% probability level).

| Certified Reference Material | Cd | Co | Cr | Cu | Hg | Mn | Ni | Pb | Zn | V |
|---|---|---|---|---|---|---|---|---|---|---|
| Relative Error | −5.2 | −3.9 | −1.5 | 3.9 | −9.8 | −3.8 | −4.1 | 4.2 | −2.0 | −5.6 |
| $t_{exp}$ | 1.98 | 1.44 | 0.50 | −1.09 | 2.20 | 1.73 | 1.16 | −1.12 | 1.12 | 1.42 |
| Seronorm ™ (Trace Element Urine) | | | | | | | | | | |
| Certified value (mg kg$^{-1}$) | 0.20 ± 0.04 | 0.72 ± 0.15 | 0.54 ± 0.12 | 31 ± NP | 0.036 ± 0.014 | 0.73 ± 0.15 | 1.51 ± 0.3 | 0.68 ± 0.13 | 334 ± 67 | 0.66 ± 0.08 |
| Found* (mg kg$^{-1}$) | <LOD | 0.68 ± 0.06 | 0.50 ± 0.04 | 31.5 ± 1.5 | <LOD | 0.75 ± 0.03 | 1.45 ± 0.09 | <LOD | 320 ± 15 | 0.61 ± 0.05 |
| Relative Error | — | −5.6 | −7.4 | 1.6 | — | 2.7 | −4.0 | — | −4.2 | −7.6 |
| $t_{exp}$ | — | 1.12 | 1.73 | −0.58 | — | −1.16 | 1.16 | — | 1.62 | 1.73 |

NP: Not provided

Example 7—Applications in Spiked Environmental Water Samples

The method was applied to the analysis of natural water samples collected from the Northern Greece area: Axios river and Volvi lake. The analytical results are presented in Table 7. The calculated recoveries were varied within the range 90.0-106.0%, indicating the applicability of the method for trace multielement determination in environmental water samples.

Example 7—Comparison of the Proposed FI/ICP-AES Method with Other Selected On-Line Column Preconcentration ICP-AES Methods For comparative purposes, the performance characteristics of the proposed method and previously published on-line column preconcentration ICP-AES methods were compared in terms of sampling frequency, detection limit, precision, and enhancement factor, as shown in Table 8. As it can be observed, the precision of the method is similar or better than the precision of other studies, since similar or better RSD values were obtained. The sampling frequency was better compared to most studies [1, 4-7], except from the ref. [2] in which a sampling frequency of 90 h$^{-1}$ was reported. The enrichment factors of the proposed study were better than those reported in most on-line SPE methods [1-2, 6-9]. However, for Cd, Co and Pb higher enrichment factors have been reported [4, 5]. Finally, the sensitivity of the proposed method was satisfactory compared to the other on-line column preconcentration ICP-AES methods.

TABLE 7

Multielement analysis of trace metals in spiked natural water samples

| Sample | Cd(II) | Co(II) | Cr(III) | Cu(II) | Hg(II) | Mn(II) | Ni(II) | Pb(II) | Zn(II) | V(II) |
|---|---|---|---|---|---|---|---|---|---|---|
| River water | <LOD | 1.9 ± 0.1 | <LOD | 4.8 ± 0.4 | <LOD | 6.2 ± 0.3 | 3.8 ± 0.2 | <LOD | 12.3 ± 0.9 | 7.4 ± 0.4 |
| Added | 5.0 | 5.0 | 5.0 | 5.0 | 5.0 | 5.0 | 5.0 | 5.0 | 5.0 | 5.0 |
| Found | 4.8 ± 0.2 | 6.5 ± 0.3 | 4.5 ± 0.3 | 9.7 ± 0.6 | 4.6 ± 0.4 | 11.1 ± 0.8 | 8.7 ± 0.5 | 5.3 ± 0.5 | 17.2 ± 0.8 | 12.1 ± 0.8 |
| Recovery (%) | 96 | 92 | 90 | 98 | 92 | 98 | 98 | 106 | 98 | 94 |
| Lake water | <LOD | <LOD | 1.3 ± 0.1 | 3.5 ± 0.3 | <LOD | 4.6 ± 0.3 | 5.5 ± 0.4 | 2.8 ± 0.3 | 9.5 ± 0.5 | 3.3 ± 0.2 |
| Added | 5.0 | 5.0 | 5.0 | 5.0 | 5.0 | 5.0 | 5.0 | 5.0 | 5.0 | 5.0 |
| Found | 4.7 ± 0.3 | 4.9 ± 0.2 | 6.5 ± 0.2 | 8.6 ± 0.5 | 4.7 ± 0.3 | 9.5 ± 0.5 | 10.4 ± 0.4 | 7.6 ± 0.6 | 14.3 ± 0.9 | 8.2 ± 0.4 |
| Recovery (%) | 94 | 98 | 104 | 102 | 94 | 98 | 98 | 96 | 96 | 98 |

$^{a}$Concentrations in µg L$^{-1}$, mean value ± standard deviation;
LOD: Limit of detection

TABLE 8

Comparison of the performance characteristics of the developed method against selected on-line SPE procedures for multielement determination with ICP-AES

| Sorbent | f(h$^{-1}$) | Characteristics | Cd | Co | Cr | Cu | Hg | Mn | Ni | Pb | Zn | V | Ref. |
|---|---|---|---|---|---|---|---|---|---|---|---|---|---|
| HyperSep SCX | 24 | $c_L$ (µg L$^{-1}$) | 0.07 | 0.06 | 0.2 | 0.08 | — | 0.1 | 0.07 | 0.2 | 0.08 | — | [1] |
| | | $s_r$ (%) | 4.5 | 3.7 | 3.9 | 4.5 | — | 3.7 | 4.2 | 2.5 | 4.2 | — | |
| | | PF | 18.4 | 18.4 | 18.4 | 18.4 | — | 18.4 | 18.4 | 18.4 | 18.4 | — | |
| AG50@-X8 Cation exchnage | 90 | $c_L$ (µg L$^{-1}$) | 1 | — | — | — | — | — | 4 | 2 | — | — | [2] |
| | | $s_r$ (%) | 2.5 | — | — | — | — | — | 2.6 | 4.0 | — | — | |
| | | PF | 10 | — | — | — | — | — | 10 | 10 | — | — | |
| Cu(II)-imprinted polymer | NA | $c_L$ (µg L$^{-1}$) | | | | 0.4 | | | | | | | [3] |
| | | $s_r$ (%) | — | — | — | 3.2 | — | — | — | — | — | — | |
| | | PF | | | | NA | | | | | | | |

TABLE 8-continued

Comparison of the performance characteristics of the developed method against selected on-line SPE procedures for multielement determination with ICP-AES

| Sorbent | f(h$^{-1}$) | Characteristics | Cd | Co | Cr | Cu | Hg | Mn | Ni | Pb | Zn | V | Ref. |
|---|---|---|---|---|---|---|---|---|---|---|---|---|---|
| EDTriA-type chitosan chelating resin | 28 | $c_L$ (μg L$^{-1}$) | 0.002 | 0.022 | — | 0.066 | — | 0.018 | 0.12 | 0.080 | 0.048 | 0.15 | [4] |
|  |  | $s_r$ (%) | <10 | <10 | — | <10 | — | <10 | <10 | <10 | <10 | <10 |  |
|  |  | PF | 116 | 93 | — | 35 | — | 14 | 16 | 112 | 25 | 19 |  |
| N-(2-hydroxyethyl)glycine-type chitosan chelating resin | 27 | $c_L$ (μg L$^{-1}$) | 0.004 | 0.023 | — | 0.068 | — | 0.018 | 0.13 | 0.085 | 0.05 | 0.17 | [5] |
|  |  | $s_r$ (%) | NA | NA | — | NA | — | NA | NA | NA | NA | NA |  |
|  |  | PF | 106 | 87 | — | 32 | — | 14 | 16 | 25 | 21 | 18 |  |
| Alumina hollow fiber membrane SPME | 5 | $c_L$ (μg L$^{-1}$) |  |  |  | 0.88 |  | 0.61 | 0.38 |  |  |  | [6] |
|  |  | $s_r$ (%) | — | — | — | 7.9 | — | 6.2 | 7.2 | — | — | — |  |
|  |  | PF |  |  |  | 10 |  | 10 | 10 |  |  |  |  |
| Modified mesoporous TiO$_2$ | 10 | $c_L$ (μg L$^{-1}$) |  |  | 0.15 | 0.23 |  |  |  | 0.50 |  | 0.09 | [7] |
|  |  | $s_r$ (%) | — | — | 2.9 | 3.9 | — | — | — | 4.6 | — | 1.7 |  |
|  |  | PF |  |  | 20 | 20 |  |  |  | 20 |  | 20 |  |
| Chitosan modified ordered mesoporous silica | 10 | $c_L$ (μg L$^{-1}$) | 0.5 |  |  | 0.30 | 0.93 |  |  | 0.96 |  | 0.33 | [8] |
|  |  | $s_r$ (%) | 4.0 | — | — | 6.7 | 5.3 | — | — | 1.8 | — | 2.8 |  |
|  |  | PF | 20 |  |  | 20 | 20 |  |  | 20 |  | 20 |  |
| MWCNTs chemically modified silica | — | $c_L$ (μg L$^{-1}$) | 0.11 |  | 0.27 | 0.91 |  |  |  |  | 0.45 | 0.55 | [9] |
|  |  | $s_r$ (%) | 3.1 |  | 3.1 | 4.0 |  |  |  |  | 4.1 | 7.3 |  |
|  |  | PF | 10 |  | 10 | 10 |  |  |  |  | 10 | 10 |  |
| Sol-gel thiocyanatopropyl silica | 50 | $c_L$ (μg L$^{-1}$) | 0.10 | 0.05 | 0.13 | 0.06 | 0.18 | 0.08 | 0.15 | 0.24 | 0.10 | 0.05 | This work |
|  |  | $s_r$ (%) | 3.9 | 2.6 | 0.8 | 1.6 | 1.7 | 2.0 | 2.2 | 7.9 | 2.5 | 2.9 |  |
|  |  | EF | 53 | 35 | 46 | 34 | 39 | 36 | 36 | 46 | 34 | 31 |  | f, sampling frequency;
$c_L$, detection limit;
$s_r$, relative standard deviation;
EF, preconcentration or enrichment factor based on their availability;
NA, not available.

All patents, patent applications, provisional applications, and publications referred to or cited herein are incorporated by reference in their entirety, including all figures and tables, to the extent they are not inconsistent with the explicit teachings of this specification. It should be understood that the examples and embodiments described herein are for illustrative purposes only and that various modifications or changes in light thereof will be suggested to persons skilled in the art and are to be included within the spirit and purview of this application.

We claim:

1. A thiocyanatopropyl and 3-aminopropyl functionalized sol-gel silica sorbent comprising a polymeric network of an acid hydrolyzed, polycondensed thiocyanatopropyl functionalized sol-gel precursor and 3-aminopropyl trimethoxysilane (3-APTMS) and/or 3-aminopropyl triethoxysilane (3-APTES), and optionally, a network precursor, wherein the thiocyanatopropyl functionalized sol-gel precursor is a sol-gel silica precursor comprising a thiocyanatopropyl group.

2. The thiocyanatopropyl and 3-aminopropyl functionalized sol-gel silica sorbent of claim 1, the thiocyanatopropyl functionalized sol-gel precursor being 3-thiocyanatopropyl triethoxysilane or 3-thiocynatopropyl trimethoxysilane.

3. The thiocyanatopropyl and 3-aminopropyl functionalized sol-gel silica sorbent of claim 1, the network precursor being tetramethyl orthosilicate (TMOS), tetraethyl orthosilicate (TEOS) or tetrapropyl orthosilicate (TPOS).

4. The thiocyanatopropyl and 3-aminopropyl functionalized sol-gel silica sorbent of claim 1, the acid being HCl, trifluoroacetic acid (TFA) or HF.

5. The thiocyanatopropyl and 3-aminopropyl functionalized sol-gel silica sorbent of claim 1, the polymeric network having a structure of

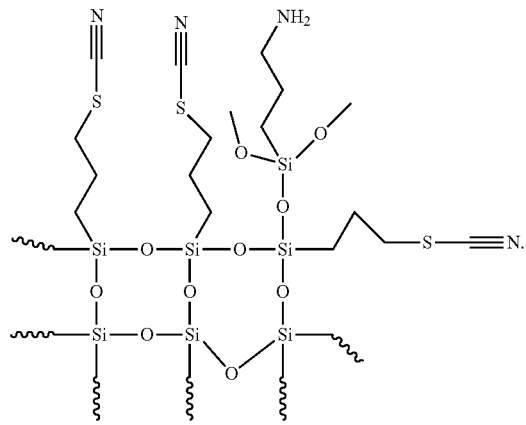

6. A method for synthesizing the thiocyanatopropyl 3-aminopropyl functionalized sol-gel silica sorbent of claim 1, the method comprising:

mixing a functional sol-gel precursor with a solvent and optionally a network precursor, to form a sol solution, wherein the functional sol-gel precursor comprises a thiocyanatopropyl group;

adding a reaction catalyst; and adding 3-aminopropyl trim ethoxysilane (3-APTMS) and/or 3-aminopropyl triethoxysilane (3-APTES).

7. The method of claim 6, the functional sol-gel precursor being 3-thiocyanatopropyl triethoxysilane or 3-thiocyanatopropyl trim ethoxysilane.

8. The method of claim 6, the network precursor being tetramethyl orthosilicate (TMOS), tetraethyl orthosilicate (TEOS) or tetrapropyl orthosilicate (TPOS).

9. The method of claim 6, the reaction catalyst being an acid selected from HCl, trifluoroacetic acid (TFA) and HF.

10. A flow injection system for preconcentration and/or extraction of a target analyte from a sample, comprising a microcolumn comprising the thiocyanatopropyl and 3-aminopropyl functionalized sol-gel silica sorbent of claim 1 in fluidic communication with a first and second 6-port 2 position injection valves and a detector.

11. The flow injection system of claim 10, the target analyte being a trace metal selected from Cd(II), Pb(II), Cu(II), Cr(III), Co(II), Ni(II), Zn(II), Mn(II), Hg(II), and V(II).

12. The flow injection system of claim 10, the sample being a fluid sample.

13. The flow injection system of claim 10, the detector being ICP-AES or a part of ICP-AES.

14. A method for detecting and/or extracting one or more trace metals from a sample, the method comprising:

passing the sample through the flow injection system of claim 11;

passing an eluent solution through the flow injection system to obtain an eluent; and detecting one or more trace metals in the eluent.

15. The method of claim 14, the one or more trace metals being selected from Cd(II), Pb(II), Cu(II), Cr(III), Co(II), Ni(II), Zn(II), Mn(II), Hg(II), and V(II).

16. The method of claim 14, the sample being a fluid sample.

17. The method of claim 16, the fluid sample being selected from physiological fluids, forensic specimens, environmental pollutants, food samples, beverage samples, pharmaceutical samples, chemical samples, drug residues and metabolites thereof, and poison residues and metabolites thereof.

18. The method of claim 14, the eluent solution being $HNO_3$.

19. The method of claim 14, the method further comprising quantifying the concentration of the one or more trace metals in the eluent.

* * * * *